(12) United States Patent
Sasakura et al.

(10) Patent No.: US 7,561,019 B2
(45) Date of Patent: Jul. 14, 2009

(54) HOME SECURITY SYSTEM

(75) Inventors: Toyoki Sasakura, Tokyo (JP); Kenichi Miyamoto, Tokyo (JP)

(73) Assignee: Super Wave Corporation, Tokyo (JP)

( * ) Notice: Subject to any disclaimer, the term of this patent is extended or adjusted under 35 U.S.C. 154(b) by 392 days.

(21) Appl. No.: 11/229,707

(22) Filed: Sep. 20, 2005

(65) Prior Publication Data

US 2006/0109966 A1    May 25, 2006

Related U.S. Application Data

(63) Continuation of application No. PCT/JP03/03573, filed on Mar. 25, 2003.

(51) Int. Cl.
*H04W 12/00* (2006.01)
*G08B 13/00* (2006.01)

(52) U.S. Cl. .......................... 340/5.1; 340/7.1; 340/5.8; 340/541; 340/825.69; 713/169

(58) Field of Classification Search ................. 340/7.1, 340/7.29, 531, 541, 5.21, 5.26, 5.8; 370/401; 709/223, 249; 726/5, 12; 713/169

See application file for complete search history.

(56) References Cited

U.S. PATENT DOCUMENTS

| | | | | |
|---|---|---|---|---|
| 6,065,120 | A * | 5/2000 | Laursen et al. ................. | 726/5 |
| 6,369,693 | B1 * | 4/2002 | Gibson ........................ | 340/5.8 |
| 6,374,079 | B1 * | 4/2002 | Hsu ........................... | 455/11.1 |
| 6,930,598 | B2 * | 8/2005 | Weiss ......................... | 340/531 |
| 6,957,111 | B2 * | 10/2005 | Zhu et al. ..................... | 700/90 |
| 7,129,816 | B2 * | 10/2006 | Tsuji et al. ................... | 340/5.26 |
| 2004/0198220 | A1 * | 10/2004 | Whelan et al. ................ | 455/41.1 |

FOREIGN PATENT DOCUMENTS

| | | |
|---|---|---|
| GB | 2 344 675 | 6/2000 |
| JP | 5-244237 | 9/1993 |

(Continued)

OTHER PUBLICATIONS

Japanese Office Action mailed Apr. 14, 2009 in corresponding Japanese Patent Application 2004-569921.

*Primary Examiner*—George A Bugg
*Assistant Examiner*—Anne V Lai
(74) *Attorney, Agent, or Firm*—Staas & Halsey LLP

(57) ABSTRACT

A security system capable of safely performing home device state check or operation. In the security system, a mobile telephone module of a mobile telephone transmits M-series data (call signal) to home device modules provided in home devices such as a door lock and home electric appliances. In response to this call, the home device module returns a home device ID to the mobile telephone module. The mobile telephone module authenticates the home device module according to the home device ID and after authentication, returns a mobile telephone ID and state check or operation command to the home device module. The home device module authenticates the mobile telephone module according to the mobile telephone ID. When this mutual authentication is complete, the home device module performs the home device state check or operation according to the command and returns the result to the mobile telephone module. Thus, the state check or operation is performed after mutual authentication and it is possible to prevent an unauthorized access of a third person.

7 Claims, 12 Drawing Sheets

FOREIGN PATENT DOCUMENTS

| | | |
|---|---|---|
| JP | 7-29075 | 1/1995 |
| JP | 9-270861 | 10/1997 |
| JP | 11-313136 | 11/1999 |
| JP | 11-341171 | 12/1999 |
| JP | 2000-184471 | 6/2000 |
| JP | 2000-253165 | 9/2000 |
| JP | 2002-111887 | 4/2002 |
| JP | 2002-252882 | 9/2002 |
| JP | 2002-304377 | 10/2002 |
| JP | 2003-037880 | 2/2003 |

\* cited by examiner

FIG. 8

| SUBSCRIBER ID | HOME SERVER ID | HOME SERVER IP ADDRESS | NAME | ADDRESS | TELEPHONE NUMBER | LIST OF HOUSEHOLD EQUIPMENT | | |
|---|---|---|---|---|---|---|---|---|
| SUBSCRIBER ID 1 | HOME SERVER ID 1 | IP ADDRESS 1 | MR. A. TANAKA | MINATO-KU, TOKYO... | 03-... | DOOR LOCK | GAS RANGE | ... |
| SUBSCRIBER ID 2 | HOME SERVER ID 2 | IP ADDRESS 2 | MS. B. SUZUKI | YOKOHAMA, KANAGAWA... | 045-... | ... | ... | |
| ... | ... | ... | ... | ... | ... | ... | | |

FIG. 11

| REGISTRANT ID | NAME | ADDRESS | TELEPHONE NUMBER | GENDER | AGE | REGISTRATION DATE |
|---|---|---|---|---|---|---|
| REGISTRANT ID 1 | MR. A. TANAKA | MINATO-KU, TOKYO··· | 03–··· | MALE | 41 | AUGUST 19 2002 |
| REGISTRANT ID 2 | MS. B. SUZUKI | YOKOHAMA, KANAGAWA··· | 045–··· | FEMALE | 28 | SEPTEMBER 1 2002 |
| ··· | ··· | ··· | ··· | ··· | ··· | ··· |

# HOME SECURITY SYSTEM

This application is a continuing application, filed under 35 U.S.C. §111(a), of International Application PCT/JP2003/003573, filed Mar. 25, 2003, now pending, herein incorporated by reference.

TECHNICAL FIELD

This invention relates to a home security system and to a method of monitoring or operating the state of household equipment, and in particular relates to a home security system and a method of monitoring or operating the state of household equipment which enable prevention of illicit access by third parties.

Further, this invention relates to a portable device, household equipment device, home server, and security device used in a home security system.

BACKGROUND ART

In general, the residents of a house lock the front door, extinguish the lighting in the house, confirm that gas appliances are turned off, and similar before leaving the house. However, there are often cases in which one's recollection as to whether the front door was locked or lighting was extinguished is uncertain, and in such cases, there is a desire to confirm the state of affairs after leaving the house.

In such cases, returning to the house to confirm the state of affairs takes time and may incur expenses for transport, and so is a considerable burden on a resident. And in cases in which for example a meeting must be attended at a prescribed time or other work or business appointments must be kept, it may be impractical to return to the house and confirm the state of affairs.

Moreover, there are cases in which one would wish to change the state of the door lock, lighting equipment, gas appliances, or other household equipment of the house. For example, should it become evident that the front door has not been locked, there is a need to lock the door. In such cases, returning to the house to operate equipment incurs similar burdens, and in some cases may not be practical. Moreover, there are cases in which, in mid-summer, there is a desire to start an air conditioner before returning home, to ensure that a room is cool upon one's return home.

In light of such situations, there is a desire to be able to remotely confirm (monitor) the state of household equipment in a house, and to be able to operate the equipment remotely.

On the other hand, there is also a need to effectively prevent remote confirmation of the state of and operation of household equipment by an illicit third party. Hence there is a demand for security enabling only a resident of the house to remotely monitor and operate household equipment, without allowing a third party to perform such actions.

DISCLOSURE OF THE INVENTION

An object of this invention is to provide a home security system capable of preventing illicit access to household equipment in a house by a third party.

A further object of this invention is to provide a home security system capable of enabling a house resident or similar to confirm the state of, or operate, household equipment in a house.

The home security system according to a first aspect of the invention is a home security system having a portable device and a household equipment device connected to household equipment provided in a house, and which monitors the state of or operates household equipment. The portable device has an input portion, which inputs commands to monitor or operate the household equipment; a first storage portion, which stores an identifier for the portable device and an identifier for a household equipment device; a first reception portion, which receives a household equipment device identifier transmitted by wireless signals from the household equipment device; a first comparison portion, which compares the identifier of the household equipment device received by the first reception portion and the household equipment device identifier stored in the first storage portion; and, a first transmission portion, which, when the result of comparison by the first comparison portion indicates two identifiers coincide, transmits the identifier of the portable device stored in the first storage portion and the command input by the input portion using wireless signals. The household equipment device comprises a second storage portion, which stores the identifier of the household equipment device and the identifier of the portable device; a second transmission portion, which transmits by wireless signals the identifier of the household equipment device, stored in the second storage portion; a second reception portion, which receives the portable device identifier and a command, transmitted by the first transmission portion; a second comparison portion, which compares the portable device identifier received by the second reception portion and the portable device identifier stored in the second storage portion; and an execution portion, which, when the result of comparison by the second comparison portion indicates that the two identifiers coincide, executes the command received by the second reception portion.

The household equipment state monitoring or operation method according to a first aspect of the invention is a method of monitoring the state of or of operating household equipment, executed by a home security system having a portable device and a household equipment device connected to household equipment provided in the house. In the household equipment device, an identifier of the household equipment device is transmitted by wireless signals; in the portable device, the identifier of the household equipment device transmitted from the household equipment device is received; in the portable device, the received identifier of the household equipment device is compared with a household equipment device identifier stored in advance in the portable device, and if as a result of comparison the two identifiers coincide, the identifier of the portable device and a command for monitoring or operation of household equipment, input from an input portion of the portable device, are transmitted by wireless signals; in the household equipment device, the portable device identifier and command transmitted from the portable device are received; in the household equipment device, the received portable device identifier is compared with a portable device identifier stored in advance in the household equipment device, and if as a result of comparison the two identifiers coincide, the received command is executed.

The home security system according to a second aspect of the invention is a home security system having a portable device, a household equipment device connected to household equipment provided in a house, and a home server connected to the household equipment device via a home network, and which monitors the state of or operates household equipment. The portable device has an input portion, which inputs commands to monitor or operate the household equipment; a first storage portion, which stores an identifier for the portable device and an identifier for the home server; a first reception portion, which receives a home server identifier transmitted by wireless signals from the home server; a first comparison portion, which compares the identifier of the home server received by the first reception portion and the home server identifier stored in the first storage portion; and, a first transmission portion, which, when the result of comparison by the first comparison portion indicates two identifiers coincide, transmits the identifier of the portable device stored in the first storage portion and the command input by the input portion using wireless signals. The home server comprises a second storage portion, which stores the identifier of the home server and the identifier of the portable device; a second transmission portion, which transmits by wireless signals the identifier of the home server, stored in the second storage portion; a second reception portion, which receives the portable device identifier and a command, transmitted by the first transmission portion; a second comparison portion, which compares the portable device identifier received by the second reception portion and the portable device identifier stored in the second storage portion; and a third transmission portion, which, when the result of comparison by the second comparison portion indicates that the two identifiers coincide, transmits the command received by the second reception portion to the household equipment device over the home network. The household equipment device comprises a third reception portion, which receives the command transmitted by the third transmission portion, and an execution portion, which executes the command received by the third reception portion.

The household equipment state monitoring or operation method according to a second aspect of the invention is a method of monitoring the state of or of operating household equipment, executed by a home security system having a portable device, a household equipment device connected to household equipment provided in the house, and a home server connected to the household equipment device over a home network. In the home server, an identifier of the home server is transmitted by wireless signals; in the portable device, the identifier of the home server transmitted from the home server is received; in the portable device, the received identifier of the home server is compared with a home server identifier stored in advance in the portable device, and if as a result of comparison the two identifiers coincide, the identifier of the portable device and a command for monitoring or operation of household equipment, input from an input portion of the portable device, are transmitted by wireless signals; in the home server, the portable device identifier and command transmitted from the portable device are received; in the home server, the received portable device identifier is compared with a portable device identifier stored in advance in the home server, and if as a result of comparison the two identifiers coincide, the received command is transmitted to the household equipment device over the home network; in the household equipment device, the command transmitted from the home server over the home network is received; and in the household equipment device, the received command is executed.

The home security system according to a third aspect of the invention is a home security system having a portable device, a household equipment device connected to household equipment provided in a house, a home server connected to the household equipment device via a home network, and a security device connected to the home server over a communication network, and which monitors the state of or operates household equipment. The portable device has an input portion, which inputs commands to monitor or operate the household equipment; a first storage portion, which stores a subscriber identifier allocated to the portable device owner or to the portable device; and, a first transmission portion, which transmits the subscriber identifier stored in the first storage portion and the command input by the input portion using wireless signals. The security device comprises a first reception portion, which receives the subscriber identifier and command transmitted from the first transmission portion; a second storage portion, which stores the subscriber identifier for a subscriber who has subscribed to an offered home security service; a first comparison portion, which compares the subscriber identifier received by the first reception portion and the subscriber identifier stored in the second storage portion; and a second transmission portion, which, when the result of comparison by the first comparison portion indicates that the two subscriber identifiers coincide, transmits the command received by the first reception portion to the home server over the communication network. The home server comprises a third reception portion which receives the command transmitted by the second transmission portion, and a third transmission portion which transmits the command received by the third reception portion to the household equipment device over the home network. The household equipment device comprises a fourth reception portion, which receives the command transmitted by the third transmission portion, and an execution portion, which executes the command received by the fourth reception portion.

The household equipment state monitoring or operation method according to a third aspect of the invention is a method of monitoring the state of or of operating household equipment, executed by a home security system having a portable device, a household equipment device connected to household equipment provided in the house, a home server connected to the household equipment device over a home network, and a security device connected to the home server over a communication network. In the portable device, a subscriber identifier allocated to the portable device owner or to the portable device and stored in the portable device, and a command to monitor or operate household equipment, input through an input portion of the portable device, are transmitted by wireless signals to the security device; in the security device, the subscriber identifier and command transmitted by the portable device are received; in the security device, the subscriber identifier of a subscriber who has subscribed to an offered home security service, stored in advance, is compared with the received subscriber identifier, and if as a result the two subscriber identifiers coincide, the received command is transmitted to the home server over the communication network; in the home server, the command transmitted by the security device is received; in the home server, the received command is transmitted to the household equipment device over the home network; in the household equipment device, the command transmitted by the home server is received; and in the household equipment device, the received command is executed.

The home security system according to a fourth aspect of the invention is a home security system having a portable device, a household equipment device connected to household equipment provided in a house, a home server connected to the household equipment device via a home network, a security device connected to the home server over a communication network, and a wireless certification device, owned or operated by a wireless certification authority, and connected to the security device over a communication network, and which monitors the state of or operates household equipment. The portable device has an input portion, which inputs commands to monitor or operate the household equipment; a first storage portion, which stores a subscriber identifier allocated to the portable device owner or to the portable device and a registrant identifier issued to the owner by the wireless authentication authority; a first transmission portion, which transmits the registrant identifier stored in the first storage portion to the wireless certification device using wireless signals; and a second transmission portion, which transmits to the security device, using wireless signals, the subscriber identifier stored in the first storage portion and a command input using the input portion. The wireless certification device comprises a second storage portion, which stores a registrant identifier of a registrant who has been registered by the wireless certification authority and certification data for the registrant; a first reception portion which receives the registrant identifier transmitted by the first transmission portion; a first comparison portion, which compares the registrant identifier received by the first reception portion and the registrant identifier stored in the second storage portion; and a third transmission portion which, when the result of comparison by the first comparison portion indicates that the two registrant identifiers coincide, transmits to the security device, over the communication network, registrant certification data corresponding to the registration identifier. The security device comprises a second reception portion, which receives the subscriber identifier and command transmitted by the second transmission portion; a third reception portion, which receives the certification data transmitted by the third transmission portion; a third storage portion, which stores the subscriber identifier of a subscriber who has subscribed to an offered security service; a second comparison portion, which compares the subscriber identifier received by the second reception portion with the subscriber identifier stored in the third storage portion; and a fourth transmission portion which, when the result of comparison by the second comparison portion indicates that the two subscriber identifiers coincide, and moreover when the certification data is received by the third reception portion, transmits to the home server, over the communication network, the command received by the second reception portion. The home server comprises a fourth reception portion, which receives the command transmitted by the fourth transmission portion, and a fifth transmission portion, which transmits the command received by the fourth transmission portion to the household equipment device over the home network. The household equipment device comprises a fifth reception portion, which receives the command transmitted by the fifth transmission portion, and an execution portion, which executes the command received by the fifth reception portion.

The household equipment state monitoring or operation method according to a fourth aspect of the invention is a method of monitoring the state of or of operating household equipment, executed by a home security system having a portable device, a household equipment device connected to household equipment provided in the house, a home server connected to the household equipment device over a home network, a security device connected to the home server over a communication network, and a wireless certification device owned or operated by a wireless certification authority, and which is connected to the security device over a communication network. In the portable device, a subscriber identifier allocated to the portable device owner or to the portable device and stored in advance in the portable device, and a command to monitor or operate household equipment input using an input portion of the portable device, are transmitted by wireless signals to the security device, and a registrant identifier, issued to the owner by the wireless certification authority and stored in advance, is transmitted by wireless signals to the wireless certification device; in the wireless certification device, the registrant identifier transmitted by the portable device is received; in the wireless certification device, the received registrant identifier and the registrant identifier of a registrant registered by the wireless certification authority and stored in advance are compared, and if the result of comparison indicates that the two registrant identifiers coincide, certification data for the registrant corresponding to the registrant identifier stored in advance is transmitted to the security device over the communication network; in the security device, the subscriber identifier and command transmitted by the portable device are received; in the security device, the received subscriber identifier and a subscriber identifier for a subscriber who has subscribed to an offered security service, stored in advance, are compared, and if the result of comparison indicates that the two subscriber identifiers coincide, and if moreover certification data transmitted by the wireless certification device is received, then the received command is transmitted to the home server over the communication network; in the home server, the received command is transmitted to the household equipment device over the home network; in the household equipment device, the command transmitted by the home server is received; and in the household equipment device, the received command is executed.

The portable device according to a fifth aspect of the invention executes wireless communication with a household equipment device connected to household equipment provided in a house, and performs monitoring of the state of or operation of the household equipment. The portable device comprises an input portion, which inputs commands to monitor or operate the household equipment; a storage portion, which stores an identifier of the portable device and an identifier of the household equipment device; a reception portion, which receives the household equipment device identifier transmitted by wireless signals from the household equipment device; a comparison portion, which compares the household equipment device identifier received by the reception portion and the household equipment device identifier stored in the storage portion; and a transmission portion which, when the result of comparison by the comparison portion indicates that the two identifiers coincide, transmits to the household equipment device by wireless signals the portable device identifier stored in the storage portion and the command input by the input portion.

The portable device according to a sixth aspect of the invention executes wireless communication with a home server connected over a home network with a household equipment device connected to household equipment provided in a house, and performs monitoring of the state of or operation of the household equipment. The portable device comprises an input portion, which inputs commands to monitor or operate the household equipment; a storage portion, which stores an identifier of the portable device and an identifier of the home server; a reception portion, which receives the home server identifier transmitted using wireless signals by the home server; a comparison portion, which compares the home server identifier received by the reception portion and the home server identifier stored in the storage portion; and a transmission portion which, when the result of comparison by the comparison portion indicates that the two identifiers coincide, transmits to the home server, using wireless signals, the portable device identifier stored in the storage portion and the command input by the input portion.

The household equipment device according to a seventh aspect of the invention is connected to household equipment provided in a house, and performs monitoring of the state of or operation of the household equipment according to instructions from a portable device. The household equipment device comprises a storage portion, which stores an identifier of the household equipment device and an identifier of the portable device; a transmission portion, which transmits the household equipment device identifier stored in the storage portion using wireless signals; a reception portion, which receives a portable device identifier and a command transmitted from the portable device; a comparison portion, which compares the portable device identifier received by the reception portion and the portable device identifier stored in the second storage portion; and an execution portion which, when the result of comparison by the comparison portion indicates that the two identifiers coincide, executes the command received by the second reception portion.

The home server according to an eighth aspect of the invention is connected over a home network to a household equipment device connected to household equipment provided in a house, and performs state monitoring or operation of the household equipment according to instructions from a portable device. The home server comprises a storage portion, which stores an identifier of the home server and an identifier of the portable device; a transmission portion, which transmits the home server identifier stored in the storage portion using wireless signals; a reception portion, which receives a portable device identifier transmitted by wireless signals from the portable device and a command to monitor or operate the household equipment; a comparison portion, which compares the portable device identifier received by the reception portion and the portable device identifier stored in the storage portion; and a transmission portion which, when the result of comparison by the comparison portion indicates that the two identifiers coincide, transmits the command received by the reception portion to the household equipment device over the home network.

The security device according to a ninth aspect of the invention is connected over a communication network to a home server, connected over a home network to a household equipment device, connected to household equipment provided in a house, and performs state monitoring or operation of the household equipment based on instructions from a portable device. The security device comprises a first storage portion, which stores a subscriber identifier of a subscriber who has subscribed to an offered home security service; a first reception portion, which receives a subscriber identifier allocated to the owner of the portable device or to the portable device and a command to monitor or operate the household equipment, transmitted by wireless signals from the portable device; a first comparison portion, which compares the subscriber identifier received by the reception portion and the subscriber identifier stored in the storage portion; and a transmission portion which, when the result of comparison by the comparison portion indicates that the two subscriber identifiers coincide, transmits the command received by the reception portion to the home server or to the household equipment device over the communication network.

BRIEF DESCRIPTION OF THE DRAWINGS

FIG. 8 shows an example of a subscriber information table held in the security server of the third aspect of the invention;

FIG. 11 shows an example of a wireless electronic certification information table held in the wireless certification server in the fourth aspect of the invention; and, FIG. 12 is a sequence diagram showing the flow of processing of the home security system in the fourth aspect of the invention.

BEST MODE FOR CARRYING OUT THE INVENTION

Figure 1:
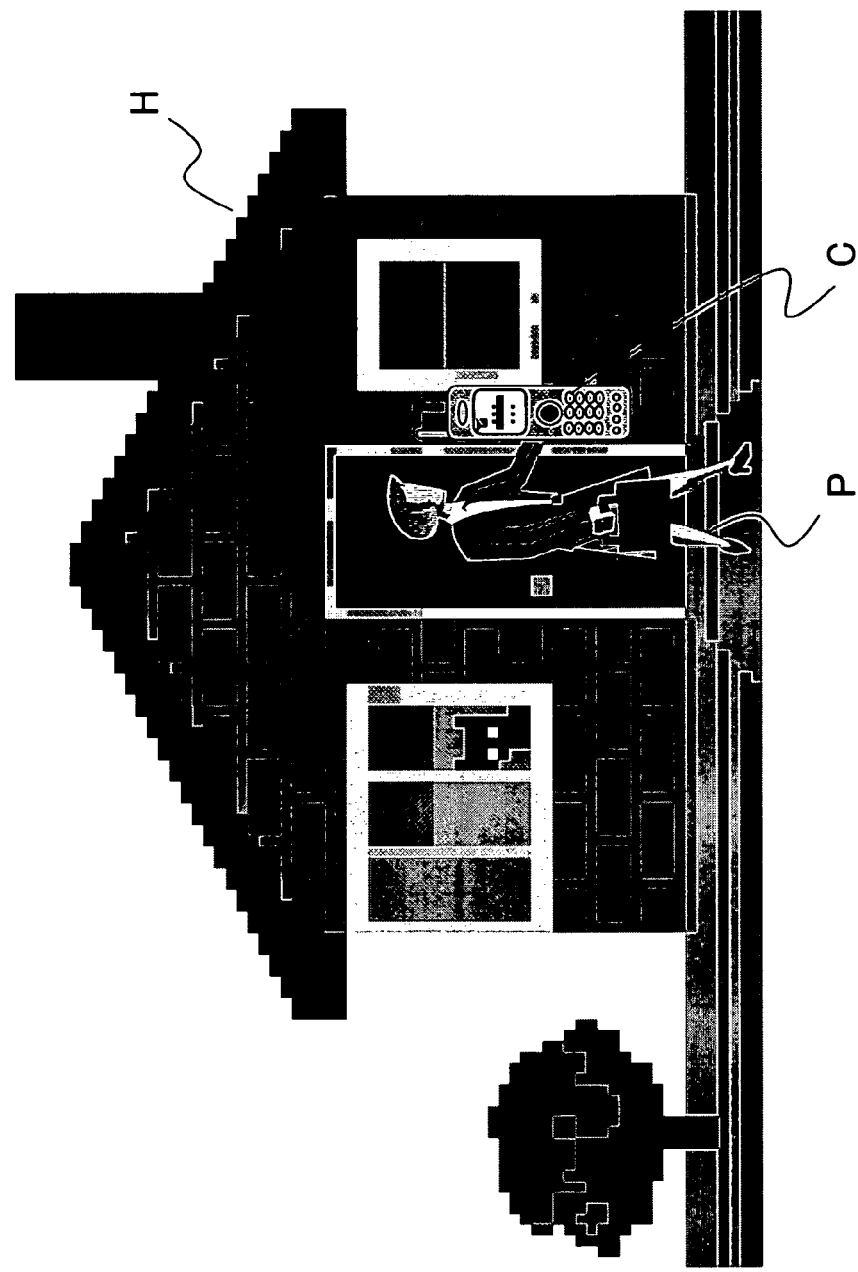
FIG. 1 shows the manner of using a portable telephone to confirm the state of a house when a resident of the house is away, or of using a portable telephone to remotely operate the front door lock or similar of the house.

With respect to a home security system of aspects of the invention, aspects are explained in which a resident (user) P of the house H who is away uses her portable telephone C to confirm (remotely monitor) the state of one or of two or more equipment units provided in the house H (hereafter called "household equipment units"), or uses her portable telephone C to remotely operate household equipment units in the house H, as shown in FIG. 1.

Household equipment units include the lock of the front door, gas appliances (for example a gas range, gas heater, or similar), electrical appliances and equipment (for example lighting, air conditioner, television set, stereo equipment, microwave oven, refrigerator, telephone, room heater, washing machine, or similar).

A home security confirmation button, not shown, is provided on the portable telephone C. When the resident P presses this home security confirmation button, a household equipment unit selection menu is displayed on the liquid crystal display (LCD) of the portable telephone C, and the resident P can select the household equipment unit the state of which is to be confirmed. All household equipment units can be selected, or only a portion of the household equipment units can be selected.

When the resident P selects household equipment units, the portable telephone C remotely confirms the state of the selected household equipment units, displaying the results on the LCD. For example, the state of the front door lock (locked/unlocked), the state of gas appliances (lit/extinguished, temperature settings, and similar), the state of electrical appliances (on/off, temperature settings, and similar), and other states of equipment in the house H are displayed on the LCD.

Further, a household equipment operation button, not shown, is provided on the portable telephone C; when the resident P presses this button, an operation selection menu is displayed on the LCD of the portable telephone C, and the resident P can select an operation. Operations which can be selected may include, for example, locking or unlocking the front door, lighting or extinguishing a gas appliance, changing a temperature setting, turning on or off an electrical appliance, changing a temperature setting, and changing a mode setting (for example, switching an air conditioner between cooling, dehumidifying, heating, and blower modes).

By selecting an operation, the resident P remotely operates the household equipment units in the house H using the portable telephone C, and the operation result (notification of operation completion or similar) is displayed on the LCD.

The security confirmation button and household equipment operation button may be hardware buttons provided on the portable telephone C, or may be software buttons displayed on the LCD of the portable telephone C.

Below, a plurality of aspects of a home security system are explained in detail.

First Aspect

In a first aspect of the invention, the portable telephone C communicates directly by wireless means with household equipment, to perform state confirmation (monitoring) and operation of the household equipment.

Figure 2:
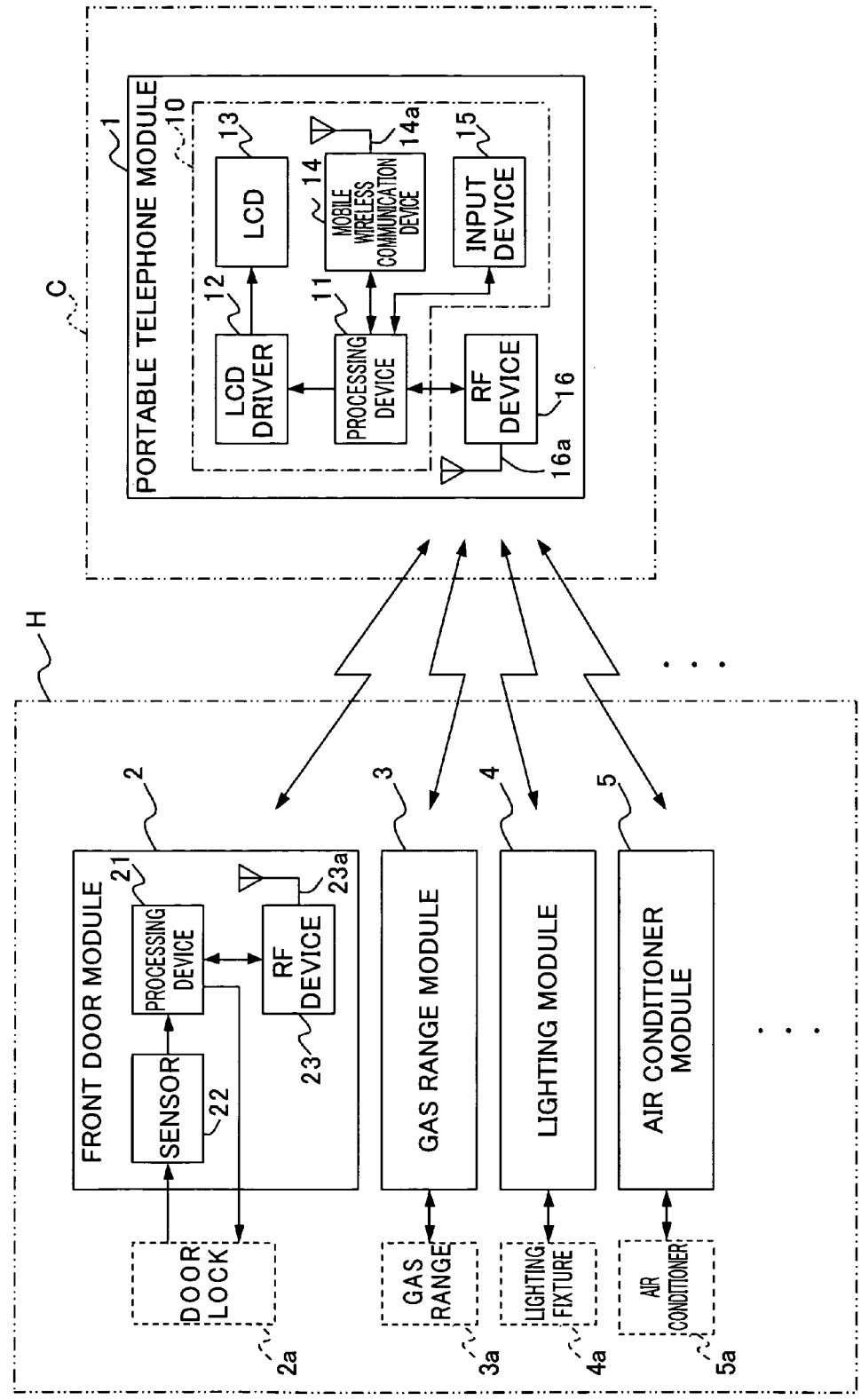
FIG. 2 is a block diagram showing the configuration of the home security system of a first aspect of the invention.

FIG. 2 is a block diagram showing the configuration of the home security system of the aspect in FIG. 1. The home security system of this first aspect has a portable telephone module 1, front door module 2, gas range module 3, lighting module 4, air conditioner module 5, and similar.

The portable telephone module 1 is incorporated within a portable telephone C (see FIG. 1) possessed by a resident P of the house H. The front door module 2, gas range module 3, lighting module 4, and air conditioner module 5 are incorporated into the front door lock, gas range, lighting fixtures, and air conditioner respectively installed in the house H. The front door, gas range, lighting fixtures, and air conditioner are examples of equipment provided in the house H; similar modules may be provided in other equipment (such as a microwave oven, refrigerator, telephone, room heater, washing machine, and similar), in which case the states of these equipment units can also be confirmed using the portable telephone C (remote monitoring), and these equipment units can be operated from the portable telephone C.

The portable telephone module 1 has a processing device 11, liquid crystal display driver (LCD driver) 12, liquid crystal display (LCD) 13, mobile wireless communication device 14, antenna 14a, input device 15, wireless communication device (RF device) 16, and antenna 16a.

The circuit module 10, comprising the processing device 11, LCD driver 12, LCD 13, mobile wireless communication device 14, antenna 14a, and input device 15 can utilize circuit modules normally present in the portable telephone C, and by utilizing these modules it necessary to add only an RF device 16 and antenna 16a to the portable telephone C, contributing to the compact size and light weight of the portable telephone C. In this case, the RF device 16 and antenna 16a may be provided in a form which is installed externally, in addition to a form of being incorporated into the portable telephone C in advance.

By embedding the functions of the RF device 16 into the mobile wireless communication device 14, the RF device 16 can be omitted. In this case, the antenna 14a can also be used as the antenna 16a.

The processing device 11 has a CPU or microcomputer (not shown), and memory (RAM, ROM, or similar, not shown) in which is stored a program executed by the CPU or microcomputer. The processing device 11 can be configured as a single-chip integrated circuit device, or can be configured as a circuit module consisting of a substrate on which are mounted a plurality of circuit components.

In addition to a program, an identifier (hereafter called the "portable telephone ID") for the portable telephone C (or for the portable telephone module 1) used in home security processing, and a table of identifiers for household equipment units (hereafter "ID table"), are also stored in the memory of the processing device 11.

Figure 3:
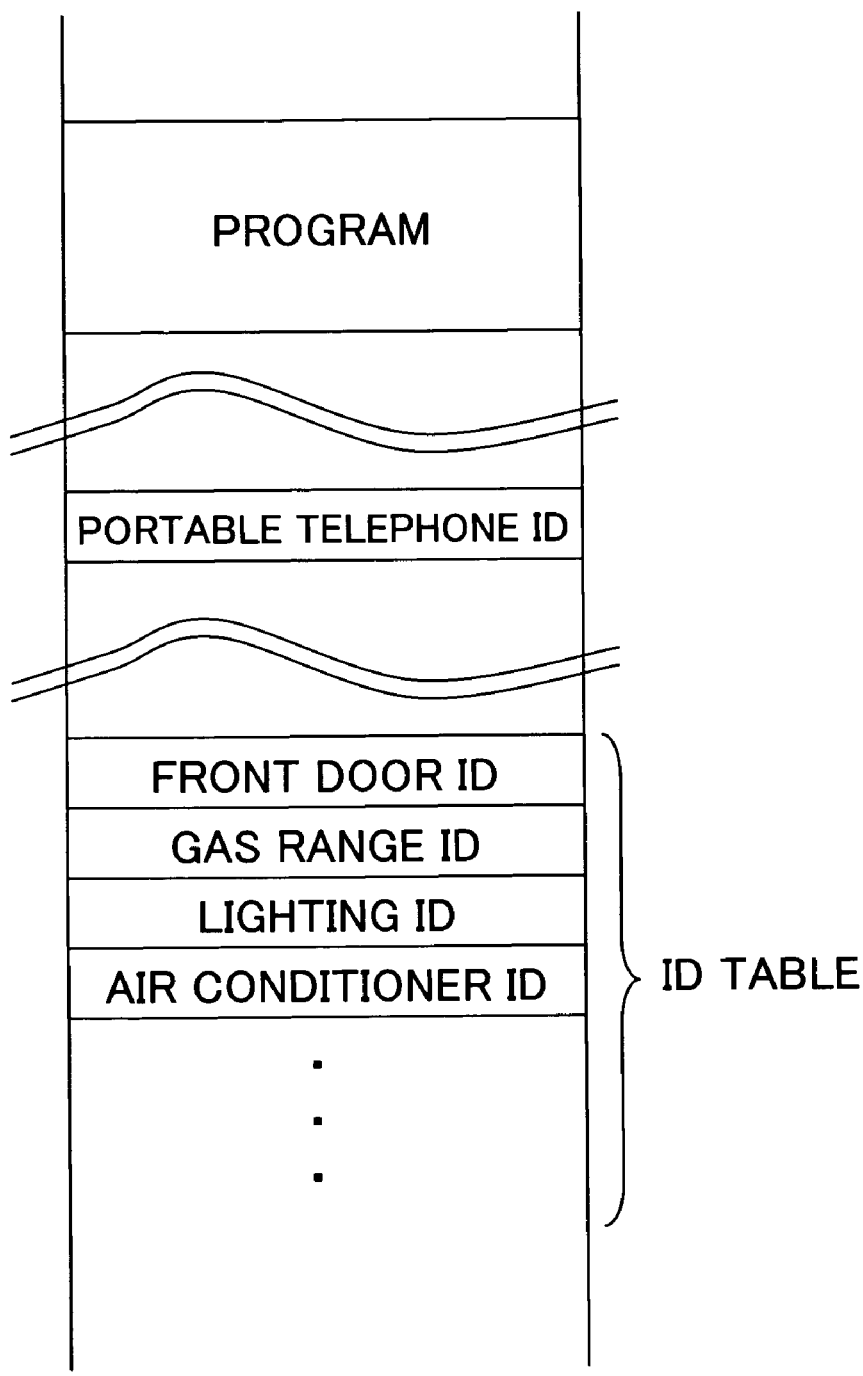
FIG. 3 shows data stored in memory of the processing device of a portable telephone module in the first aspect of the invention.

FIG. 3 shows data stored in the memory of the processing device 11. As explained above, a program, portable telephone ID, and ID table are stored. The ID table contains the IDs (household equipment unit IDs) of household equipment units (or of household equipment modules).

In FIG. 3, as one example, the ID table contains the identifier (front door ID) of the front door lock 2a (front door module 2); the identifier (gas range ID) of the gas range 3a (gas range module 3); the identifier (lighting ID) of the lighting fixtures 4a (lighting module 4); the identifier (air conditioner ID) of the air conditioner 5a (air conditioner module 5); and similar.

The portable telephone ID and the various household equipment unit IDs comprised by the ID table are all different, and the module (and whether the device is the portable telephone or a household equipment unit) can be determined uniquely using the ID.

The processing device 11 executes the program stored in its own memory, and executes prescribed communication processing and similar of the portable telephone C, as well as executing processing related to the home security of this aspect. This processing related to home security comprises the above-described monitoring of the states of household equipment and operation of household equipment. Details of this processing are described below.

Returning to FIG. 2, the LCD driver 12 drives and controls the LCD 13, and displays data provided by the processing device 11 on the LCD 13. The mobile wireless communication device 14 performs the communication processing (protocol processing, modulation, frequency conversion, amplification, and similar) necessary for wireless communication via the antenna 14a and mobile communication network.

The input device 15 comprises, for example, input buttons for telephone numbers, the characters of electronic mail and similar, provided on the portable telephone C; buttons can also be used as the home security confirmation button and household equipment operation button.

The processing device 11 converts data input through operation of the home security confirmation button into a state confirmation command and household equipment unit IDs for the household equipment units (all or a portion) specified for state confirmation by the resident P, and stores these in its own memory. Upon conversion into household equipment unit IDs, the ID table (see FIG. 3) is referenced by the processing device 11.

State confirmation commands may be, for example, a locked/unlocked state confirmation command for the door lock 2a, an on/off state confirmation command for the air conditioner 5a, temperature setting confirmation commands, operating mode confirmation commands, and similar.

The processing device 11 also converts data input through operation of the household equipment operation button into an operation command and household equipment unit IDs for the household equipment units (all or a portion) specified for operation by the resident P, and stores these in its own memory. Upon conversion into household equipment unit IDs, the ID table (see FIG. 3) is referenced by the processing device 15.

Operation commands may be, for example, lock commands and unlock commands for the door lock 2a, turn-on and turn-off commands, temperature setting modification commands, operating mode modification commands and similar for the air conditioner 5a, and similar. There are also operation commands to which parameters are appended. For example, a parameter specifying the temperature setting is appended to the command to modify the temperature setting of the air conditioner 5a. The command to modify the operating mode of the air conditioner 5a has appended a parameter indicating that the operating mode is cooling, heating, blowing, or dehumidifying.

The RF device 16 transmits a baseband signal (data) provided by the processing device 11 via the antenna 16a as wireless signals, and converts wireless signals received from the antenna 16a into baseband signals, which are provided to the processing device 11. Thus the RF device 16 performs modulation, frequency conversion, amplification, and other processing. A prescribed frequency of several hundred MHz or several GHz (for example, the 300 MHz band, or the 2.4 GHz band) is used as the frequency of wireless signals (wireless frequency: RF).

The transmission power of the RF device 16 is set depending on the distance over which communication with the household equipment is possible. In this aspect, as one example, the distance over which communication is possible is within the range several meters to several tens of meters (a short distance), and the transmission power is set to approximately several milliwatts. Hence a resident P possessing a portable telephone C can use the portable telephone C to perform the home security operations of this aspect within the house H and within a distance of several meters to several tens of meters from the house H.

The RF device 16 stores M series (maximum length null sequence) data in internal memory. The RF device 16 transmits this M series data by means of wireless signals. The M series data is one type of binary pseudorandom signal, and is a code series consisting of 1's and 0's of length ($2^n-1$), where n is a positive integer. For example, if n=5, then the code consists of 31 bits of data. In this aspect, M series data is used as a signal for calling household equipment units (a kind of preamble signal).

The front door module 2 has a processing device 21, sensor 22, RF device 23, and antenna 23a. In FIG. 2, the detailed configuration of only the front door module 2 is shown; but the gas range module 3, lighting module 4, air conditioner module 5 and similar have a similar configuration, except that the object of control or monitoring is the gas range 3a or similar, and so the explanation given below for the front door module 2 similarly applies. Hence in the following, details of the front door module 2 are explained, and explanations of the gas range module 3 and other modules are omitted.

The sensor 22 detects the locked or unlocked state of the door lock (electronic lock) 2a of the front door, and notifies the processing device 21 of the state of the door lock 2a. For example, when the door lock 2a is in the locked state, a high-level signal is applied to the processing device 21, and when the door lock 2a is in the unlocked state, a low-level signal is applied to the processing device 21.

The RF device 23 has functions and configuration similar to that of the RF device 16 of the portable telephone module 1; when a baseband signal (data) provided by the processing device 21 is transmitted by wireless signals via the antenna 23a, the wireless signals received by the antenna 23a are converted into a baseband signal, which is provided to the processing device 21. Hence the RF device 23 performs modulation, frequency conversion, amplification, and other processing. The frequency band of the wireless signals is set to the frequency band for transmission and reception of the RF device 16. The power transmission is also set to the same value as the power transmission of the RF device 16.

Further, the RF device 23 stores the M series data which is the same as the M series data stored in the memory of the RF device 16.

Upon receiving M series data transmitted by the RF device 16, the RF device 23 compares the data with M series data stored in its own internal memory. If the result of comparison indicates that the number of coinciding bits in the M series data is equal to or exceeds a prescribed threshold, then the coinciding signal is provided to the processing device 21. Comparison of M series data and calculation of the number of coincident bits can be performed by, for example, comparing both M series data, adding the number of coinciding bits, and outputting added values as pulse compression signals by means of a coincidence/addition circuit (not shown). The prescribed threshold is set to, for example, 24 when the M series data has 31 bits.

The processing device 21 has a CPU or microcomputer (not shown), and memory (RAM, ROM or similar) which stores a program executed by the CPU or microcomputer. The processing device 21 can be configured as a single-chip integrated circuit device, or can be configured as a circuit module consisting of a substrate on which are mounted a plurality of circuit components.

In addition to a program, a front door ID and portable telephone ID, used in home security processing, are also stored in the memory of the processing device 21. Respective identifiers (gas range ID, lighting ID, air conditioner ID, and similar) and the portable telephone ID are likewise stored in the processing device memory of the gas range module 3, lighting module 4, air conditioner module 5, and similar.

The processing device 21 executes the program stored in its own memory, and executes processing related to the home security of this aspect. This home security-related processing comprises processing to notify the portable telephone module 1 of the state of the door lock 2a detected by the sensor 22 and operations to lock or unlock the door lock 2a, according to instructions from the portable telephone module 1. Details of this processing are explained below.

The gas range module 3, lighting module 4, air conditioner module 5 and similar each perform state confirmation and operation of the gas range 3a, lighting fixtures 4a, air conditioner 5a, and similar, respectively, according to instructions from the portable telephone module 1.

Figure 4:
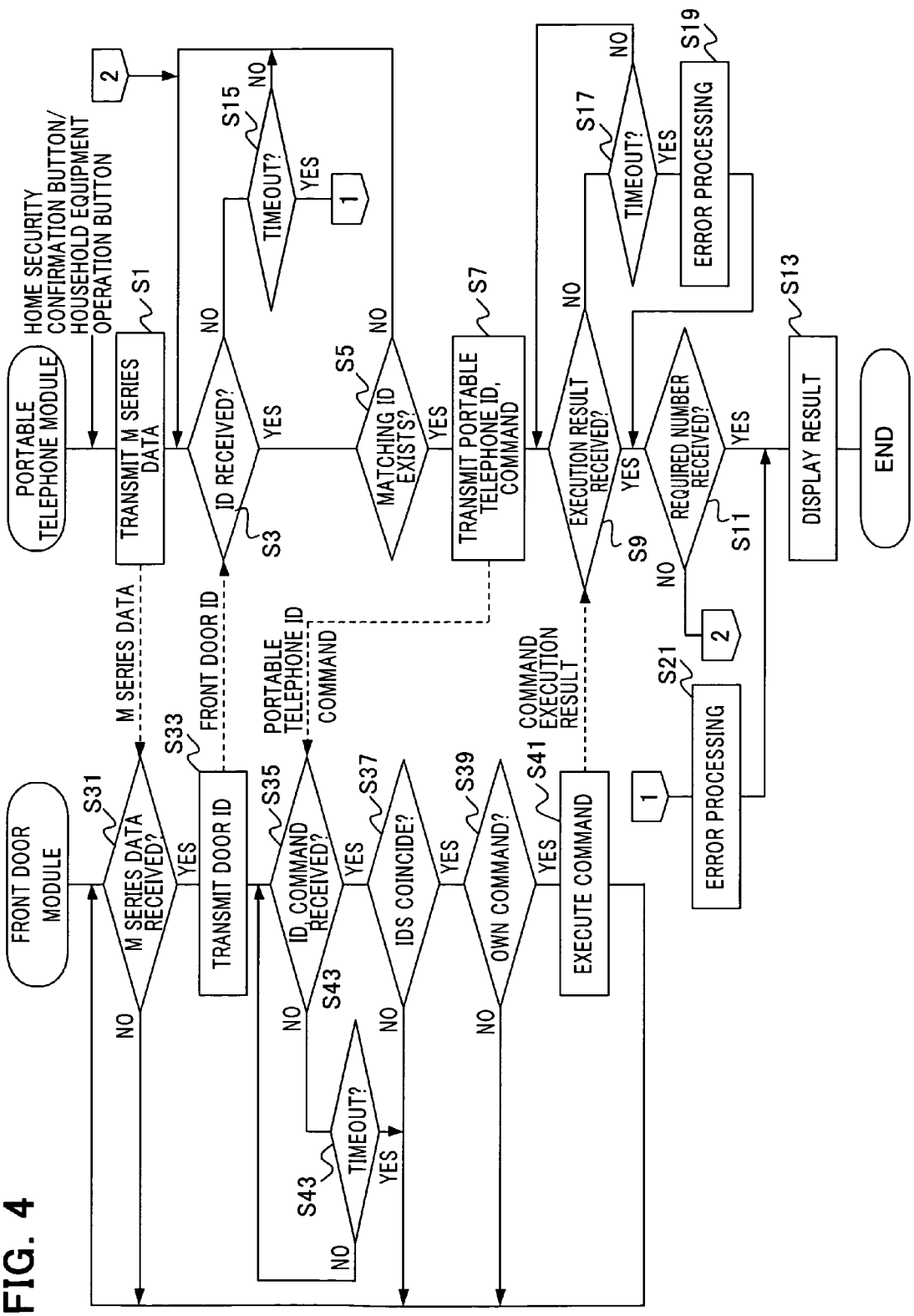
FIG. 4 is a flowchart showing the flow of processing of the home security system in the first aspect of the invention.

FIG. 4 is a flowchart showing the flow of processing of the home security system; as one example, the flow of processing of the portable telephone module 1 and front door module 2 is shown.

When the resident P presses the home security confirmation button or the household equipment operation button of the portable telephone C, the processing device 11 of the portable telephone module 1 provides an M series data transmission instruction to the RF device 16. As a result, the RF device 16 transmits the M series data stored in its own memory to the household equipment, as a call signal (S1). It is preferable that the M series data be transmitted a plurality of times in a several-second interval (for example, two seconds) to the household equipment as a call signal.

After transmission of the M series data, the portable telephone module 1 enters a reception wait state to receive a household equipment ID from the household equipment, for a prescribed time (for example, several tens of seconds) ("NO" in S3, "NO" in S17).

M series data is broadcast using wireless signals, and so is received by all household equipment modules in the house H. Hence all the household equipment modules return their own household equipment unit IDs to the portable telephone module 1. When all the household equipment unit modules simultaneously return their household equipment unit IDs to the portable telephone module 1, there is the concern that signals may be confused, so that IDs cannot be received by the portable telephone module 1.

In order to prevent this, after receiving the M series data, each of the household equipment unit modules returns its household equipment unit ID to the portable telephone module 1 using any one among time-division multiplex communication, frequency-division multiplex communication, and code-division multiplex communication, or similar. For example, when time-division multiplexing is used to return household equipment unit IDs, each of the household equipment unit modules, upon receiving the M series data, returns the household equipment unit ID in an allocated time slot.

Or, a single master module may be set among the household equipment unit modules, with the other modules set as slave modules, configured such that when the master module receives a household equipment unit ID from a slave module, only the master module returns the household equipment unit ID received from the slave module to the portable telephone module 1.

Below, a case in which time-division multiplexing is used to transmit household equipment unit IDs in respective prescribed time slots is explained.

The time from transmission of a certain M series data set to the next M series data set (for example, two seconds) is divided into a plurality of time slots. Here, it is supposed that the first time slot is allocated to the front door module 2, and that the second through fourth time slots are allocated in sequence to the gas range module 3, lighting module 4, and air conditioner module 5, respectively.

While in the idle state, the RF device 23 of the front door module 2 is in a state of waiting to receive M series data (S31), and upon receiving M series data from the portable telephone module 1, checks whether the data coincides with the M series data stored in its own internal memory.

If the number of coincident bits is equal to or greater than a prescribed threshold, the RF device 23 judges that the M series data has been received ("YES" in S31), and provides the coincident signal to the processing device 21. The processing device 21, upon receiving the coincident signal from the RF device 23, transmits the front door ID stored in its own memory via the RF device 23, using the first time slot (S33). The gas range module 3 and other modules likewise transmit their own household equipment unit IDs in time slots allocated to those modules.

Together with this household equipment unit ID, an acknowledgement response signal (ACK signal) acknowledging that the M series signal was received may also be sent.

Upon receiving a household equipment unit ID (here, the front door ID) ("YES" in S3), the RF device 16 of the portable telephone module 1 provides the received household equipment unit ID to the processing device 11.

The processing device 11 checks whether an ID coinciding with the household equipment unit ID received from the RF device 16 exists among the household equipment unit IDs for command transmission stored in its own memory (S5). If a coincident ID exists ("YES" in S7), the household equipment unit module corresponding to this ID (here, the front door module 2) is certified by the portable telephone module 1 (processing device 11). As a result, the processing device 11 transmits, via the RF device 16, the portable telephone ID and a command input from the portable telephone 1 by the resident P (a state confirmation command or an operation command) (S9).

The transmitted portable telephone ID and command are broadcast using wireless signals, and so are received by all the household equipment unit modules existing in the house H. However, even if for example a command for the front door module 2 is received by the gas range module 3, the command is not executed by the gas range module 3.

This can be achieved by providing commands separately for each module, so that each module identifies the commands and executes only those commands addressed to itself. For example, state confirmation commands are provided separately, as for example door lock state confirmation commands, gas range state confirmation commands, and similar.

Or, this may be achieved by using commands which comprise the household equipment unit ID (for example, the front door ID) for the module which is to execute the command; or, by transmitting the household equipment unit ID for the module together with the command.

When the processing device 21 of the front door module 2 receives a portable telephone ID and command (and household equipment unit ID) via the RF device 23 before a prescribed time elapses (for example, from several milliseconds to several seconds) ("YES" in S35), the processing device 21 compares the received portable telephone ID with the portable telephone ID stored in its own memory (S37). If the two portable telephone IDs coincide ("YES" in S37), the portable telephone module 1 has been certified by the front door module 2 (processing device 21).

Next, the processing device 22 judges whether the received command is a command addressed to itself (S39), and if the command is addressed to itself ("YES" in S39), executes the command (S41).

After the portable telephone module 1 has thus certified a household equipment unit module (S5), and moreover the household equipment unit module has certified the portable telephone 1 (S37), the household equipment unit module executes the command from the portable telephone module 1. By this means, illicit access to household equipment by a third party is prevented, and home security is maintained.

When a received command is a state confirmation command, the processing device 21 transmits the state of the door lock 2a (the locked state or the unlocked state) detected by the sensor 22 via the RF device 23, as the command execution result. When the command is a lock operation command, the processing device 21 provides a locking signal to the door lock 2a to lock the door lock 2a, and transmits a lock completion signal via the RF device 23 as the command execution result. When the command is an unlock operation command, the processing device 21 provides an unlocking signal to the door lock 2a to lock the door lock 2a, and transmits an unlock completion signal via the RF device 23 as the command execution result.

As explained above, when a received command is not a command for the front door module 1 ("NO" in S39), the processing device 21 returns to step S31 and enters a state of waiting to receive M series data. In step S35, if the processing device 21 does not receive a portable telephone ID and command during a prescribed time interval, resulting in a timeout ("YES" in S43), processing returns again to step S31, and the processing device 21 enters a state of waiting to receive M series data.

After the processing of step S9, the processing device 11 of the portable telephone module 1 enters a state of waiting for the command execution result for a prescribed time interval (for example, from several milliseconds to several seconds) (S9), and upon receiving the command execution result ("YES" in S9), judges whether required number of command execution results have been received (S11). The "required number" is the number of household equipment units selected by the resident P for state confirmation or operation.

Similarly to commands, command execution results are either provided uniquely for each module, or the household equipment unit ID of the household equipment unit transmission source is comprised by the command result. Hence the portable telephone module 1 (processing device 11) can determine whether an execution result has been received from an other-party module which had transmitted a command in step S9. Consequently the processing device 11 proceeds to step S13 only when a command execution result has been received from the front door module 2.

When the required number of command execution results have not been received ("NO" in S11), the processing device 11 returns to step S3 and enters a state of waiting to receive an ID from modules other than the front door module 2 (for example, from the gas range module 3). When an ID is received (including cases of an ID already received during execution of the processing of steps S5 through S13 for the front door module 2), the processing of step S5 and beyond is similarly executed.

When the required number of command execution results are received ("YES" in S11), the processing device 11 displays the command execution results on the LCD 13, through the LCD driver 12 (S13).

In the case of command execution results for a state confirmation command, the states of each of the selected household equipment units are displayed on the LCD 13. For example, "Front door lock: locked state", "Gas range: extinguished state", and similar are displayed. In the case of command execution results for operation commands, notification of completion of the operation for the selected household equipment unit is displayed. For example, "Front door locking completed" or similar is displayed. By this means, the resident P can confirm the state of the household equipment, or can confirm that the operation on the household equipment has been completed.

When in step S3 the household equipment ID is not received over a prescribed time interval, so that a timeout occurs ("YES" in S15), the processing device 11 executes error processing (S21), displays the error processing result (an error message or similar) on the LCD 13 (S13), and ends processing.

When in step S5 a coincident ID does not exist, processing returns to step S3, and processing from step S3 is repeated.

When in step S9 a command execution result is not received for a prescribed time interval, so that a timeout occurs ("YES" in S17), the processing device 11 executes error processing, and processing from step S11 is then executed.

Thus according to this aspect, after the portable telephone module 1 and each of the household equipment unit modules have undergone mutual certification, state confirmation or operation of the household equipment is performed, so that illicit access to the household equipment by a third party (either state confirmation or operation) can be prevented, and home security can be maintained.

The household equipment unit IDs and portable telephone ID can be encrypted and transmitted. As a result, home security can be further enhanced.

The M series data (call signals) may be transmitted by each of the household equipment unit modules, rather than by the portable telephone module 1.

Monitoring and operation for home security using a portable telephone C have been explained; however, the functions of the portable telephone module 1 may be incorporated into a wristwatch, so that the wristwatch can be used to perform state confirmation and operation of household equipment.

Second Aspect

In the second aspect of the invention, household equipment and a home server are connected over a home network, a portable telephone 1 and the home server communicate by wireless means, and state confirmation and operation of the household equipment is performed.

Figure 5:
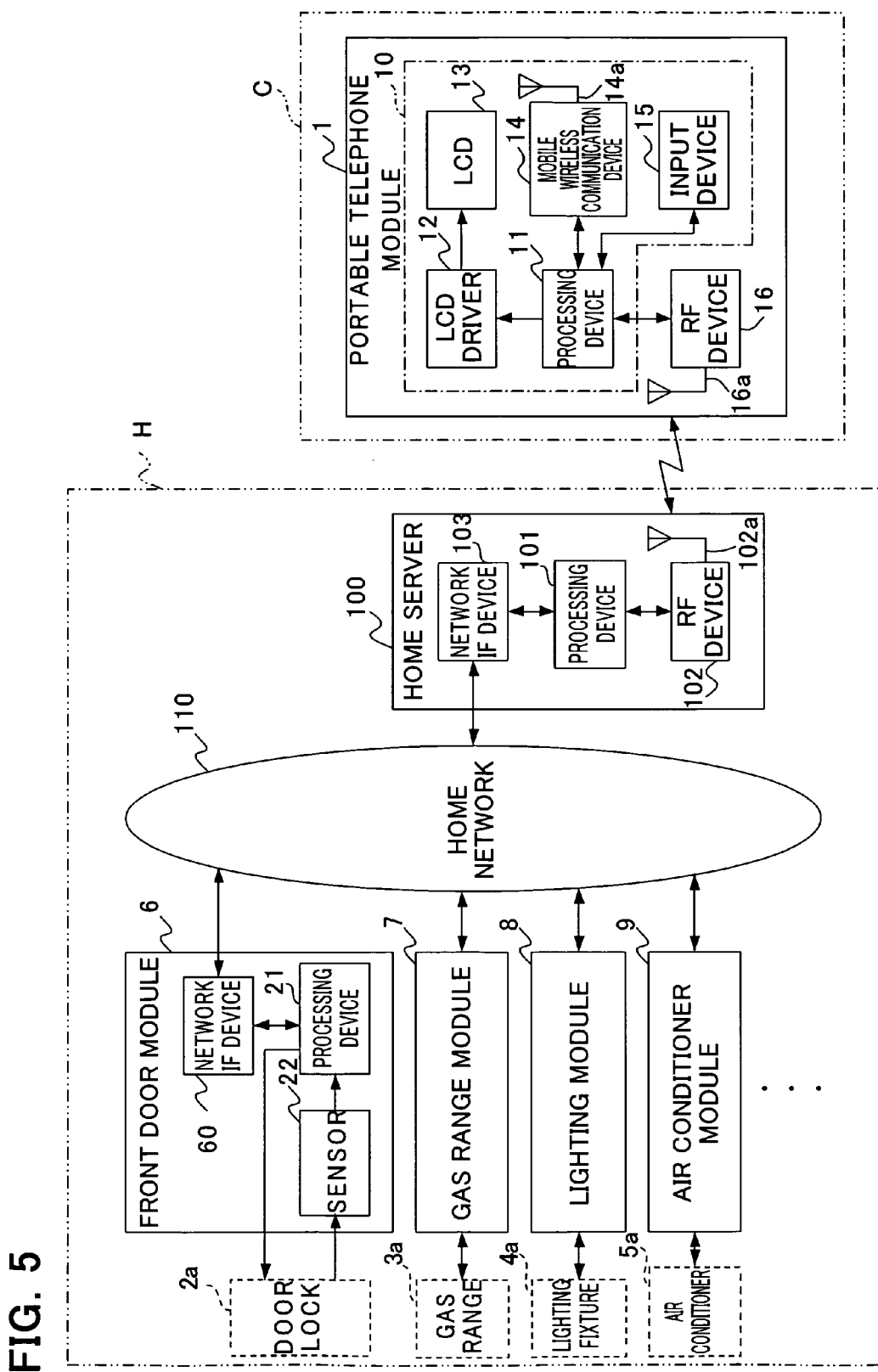
FIG. 5 is a block diagram showing the configuration of the home security system in a second aspect of the invention.

FIG. 5 is a block diagram showing the configuration of the home security system of the second aspect. The home security system of this second aspect has a portable telephone module 1; home server 100; front door module 6; gas range module 7; lighting module 8; air conditioner module 9; and similar.

The portable telephone module 1 has the same configuration as the portable telephone module 1 in the first aspect shown in FIG. 2, and so the same constituent components are assigned the same symbols as in FIG. 2. However, in place of household equipment unit IDs, an identifier of the home server 100 (home server ID) is stored in the memory of the processing device 11.

The home server 100, front door module 6, gas range module 7, lighting module 8, air conditioner module 9 and similar are provided within the house H. The home network 110 is a local area network (LAN) provided within the house H. The home server 100, front door module 6, gas range module 7, lighting module 8, air conditioner module 9 and similar are connected by the home network 110, and each has an IP address (local address in the home network 110, or global address). The home server 100, front door module 6, gas range module 7, lighting module 8, air conditioner module 9 and similar can communicate with each other over the home network 110, based on these IP addresses.

The front door module 6 has a processing device 21, sensor 22, and network interface device (network IF device) 60. The processing device 21 and sensor 22 are the same as the processing device 21 and sensor 22 of the front door module 2 in the first aspect shown in FIG. 2, and so the same symbols are assigned, and a detailed explanation is omitted. The network IF device 60 comprises for example a network interface card or similar, and executes processing for the interface with the home network 110 (communication protocol processing and similar). This network IF device 60 is provided in place of the RF device 23 of the front door module 2 in FIG. 2.

The other household equipment unit modules, which are the gas range module 7, lighting module 8, air conditioner module 9 and similar, are similarly configured; the processing device and sensor are the same as in the first aspect, and in place of an RF device, a network IF device is provided.

The home server 100 has a processing device 101, RF device 102, antenna 102a, and network IF device 103.

The RF device 102 has functions and configuration similar to those of the RF device 16 of the portable telephone module 1, and so a detailed description is here omitted. The network IF device 103 has functions and configuration similar to those of the network IF device 60, and executes processing to interface with the home network 110.

The processing device 101, similarly to the processing device 21, comprises a CPU or microcomputer and memory, and in addition to normal home server processing, executes the home security processing of this aspect, described below.

The home server ID and portable telephone ID are stored in the memory of the processing device 101.

Figure 6:
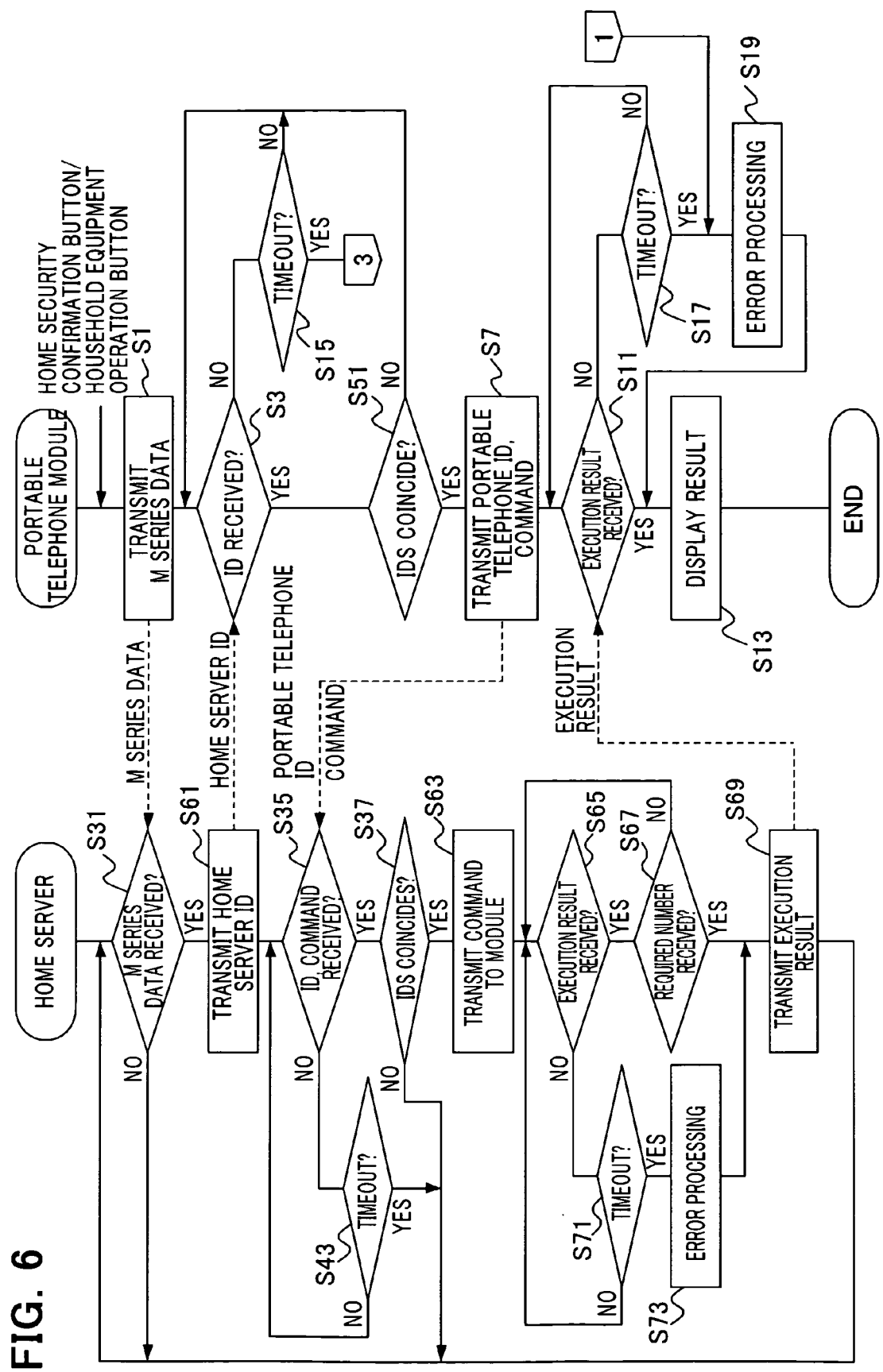
FIG. 6 is a flowchart showing the flow of processing of the home security system in the second aspect of the invention.

FIG. 6 is a flowchart showing the flow of processing in the home security system of the second aspect of the invention. Processing which is the same as processing in the first aspect shown in FIG. 4 is assigned the same symbol, and detailed descriptions are omitted.

In this aspect, only the home server 100 performs wireless communication with the portable telephone module 1, and exchanges household equipment unit IDs.

When a resident P presses the home security confirmation button or household equipment operation button on the portable telephone C, the RF device 16 of the portable telephone module 1 transmits M series data. Upon receiving M series data from the RF device 16 ("YES" in S31), the RF device 102 of the home server 100 compares the received M series data with M series data which it stores itself. If the number of coincident bits of the two M series data sets is equal to or exceeds a prescribed threshold, the coincident signal is provided to the processing device 101.

Upon receiving the coincident signal from the RF device 102, the processing device 101 transmits the home server ID stored within its own memory to the RF device 102 (S61). Upon receiving the home server ID within a prescribed time interval (for example, from several milliseconds to several seconds) after M series data transmission ("YES" in S3), the processing device 11 of the portable telephone module 1 judges whether the received home server ID coincides with the home server ID stored in the memory of the processing device 11 (S51).

When the two home server IDs coincide ("YES" in S51), the home server 100 has been certified by the portable telephone module 1. As a result, the portable telephone module 1 transmits the portable telephone ID stored in its own memory and the command input by the resident P (S7).

Upon receiving the portable telephone ID and command within a prescribed time interval (for example, several milliseconds to several seconds) after transmission of the home server ID ("YES" in S35), the processing device 101 of the home server 100 judges whether the received portable telephone ID and the portable telephone ID stored in the memory of the processing device 101 coincide (S37).

When the two portable telephone IDs coincide ("YES" in S37), the portable telephone module 1 (portable telephone C) has been certified by the home server 100. As a result, the processing device 101 transmits the received command over the home network 110 to the household equipment unit module which is to execute the command (S63).

After the portable telephone module 1 has thus certified the home server 100 (S51), and the home server 100 has certified the portable telephone module 1 (S37), the home server 100 provides the command to the household equipment unit module, and causes the command to be executed. By this means, illicit access to the household equipment by a third party can be prevented, and home security can be maintained.

The household equipment unit module which executes the command can, as explained in the first aspect, be identified by the command, or, the portable telephone module 1 can include a household equipment unit ID in the command for transmission, or, can be identified by transmitting the household equipment unit ID together with the command. By means of any one of these methods, the processing device 101 identifies the household equipment unit module to which the command is to be transmitted, and transmits the command to the identified household equipment unit module.

When a plurality of household equipment units are to receive a command, a command is transmitted to the plurality of household equipment unit modules. For example, when a command includes a plurality of household equipment unit IDs, the command is transmitted to the plurality of household equipment units.

Upon receiving a command, a household equipment unit module executes the command, and returns the command execution result to the home server 100 over the home network 110.

For example, when a command is to confirm the state of the gas range module 7, the command is transmitted to the gas range module 7 over the home network 110. The gas range module 7 detects the state of the gas range 3a (lit state/ extinguished state), and returns the detected state to the home server 100 over the home network 110.

When a command is used to change the temperature setting of the air conditioner, the command is transmitted to the air conditioner module 9 over the home network 110. The air conditioner module 9 sets the temperature setting of the air conditioner 5a to the temperature contained in the command, and returns a temperature setting completion signal, as the command execution result, to the home server 100 over the home network 110.

The processing device 101 of the home server 100 enters a state of waiting to receive the required number of command execution results, during a prescribed time interval (for example, from several milliseconds to several seconds) after command transmission (S65, S67, S71). Here, the "required number" is, as in the above-described first aspect, the number of household equipment unit selected for state confirmation or operation by the resident P, or may be the number of household equipment units to which a command has been transmitted by the home server 100.

When the processing device 101 receives the required number of execution results within the prescribed time interval ("YES" in S65, "YES" in S67), the received required number of execution results are transmitted to the portable telephone module 1 (S69).

When the portable telephone module 1 receives the command execution results in the prescribed time interval ("YES" in S11), the received command execution results are displayed on the LCD 13 (S13). By this means, the resident P can confirm the states of household equipment units, or can confirm that operation of household equipment units has been completed.

In step S3, when the home server ID is not received and a timeout occurs ("YES" in S15), the portable telephone module 1 performs error processing, and displays the error processing results (error messages or similar) on the LCD (S13). In step S35, when the portable telephone ID and command are not received within the prescribed time interval and a timeout occurs ("NO" in S35), processing returns to step S31, and the processing device 101 of the home server 100 enters a state of waiting to receive M series data.

When in step S65 the required number of execution results are not received within the prescribed time interval and a timeout occurs ("YES" in S71), the processing device 101 returns information indicating this fact about the received command execution results to the portable telephone module 1, performs error processing for command execution results not received, and returns the error processing results to the portable telephone module 1 (S69).

In step S11, when during the prescribed interval the execution results (and error processing results) are not received, and a timeout occurs ("YES" in S17), the portable telephone module 1 performs error processing (S19) and displays the error processing results on the LCD 13 (S13).

In this way, according to this aspect the portable telephone module 1 and home server 100 certify each other, and after certification the state confirmation or operation of the household equipment is performed, so that illicit access (state confirmation or operation) to the household equipment units (and home server 100) by a third party can be prevented, and home security can be maintained.

The home server ID and portable telephone ID can be encrypted and transmitted. By this means, home security can be further enhanced.

M series data (call signals) may be transmitted to the home server 100 rather than to the portable telephone module 1.

Monitoring and operation by a portable telephone C in a home security system has been explained; but the functions of the portable telephone module 1 can be incorporated into a wristwatch, and the wristwatch used to perform state monitoring and operation of household equipment.

Third Aspect

In a third aspect of the invention, a portable telephone module 1 performs state confirmation and operation of household equipment through a security server (security device) 200 of a home security enterprise S.

Figure 7:
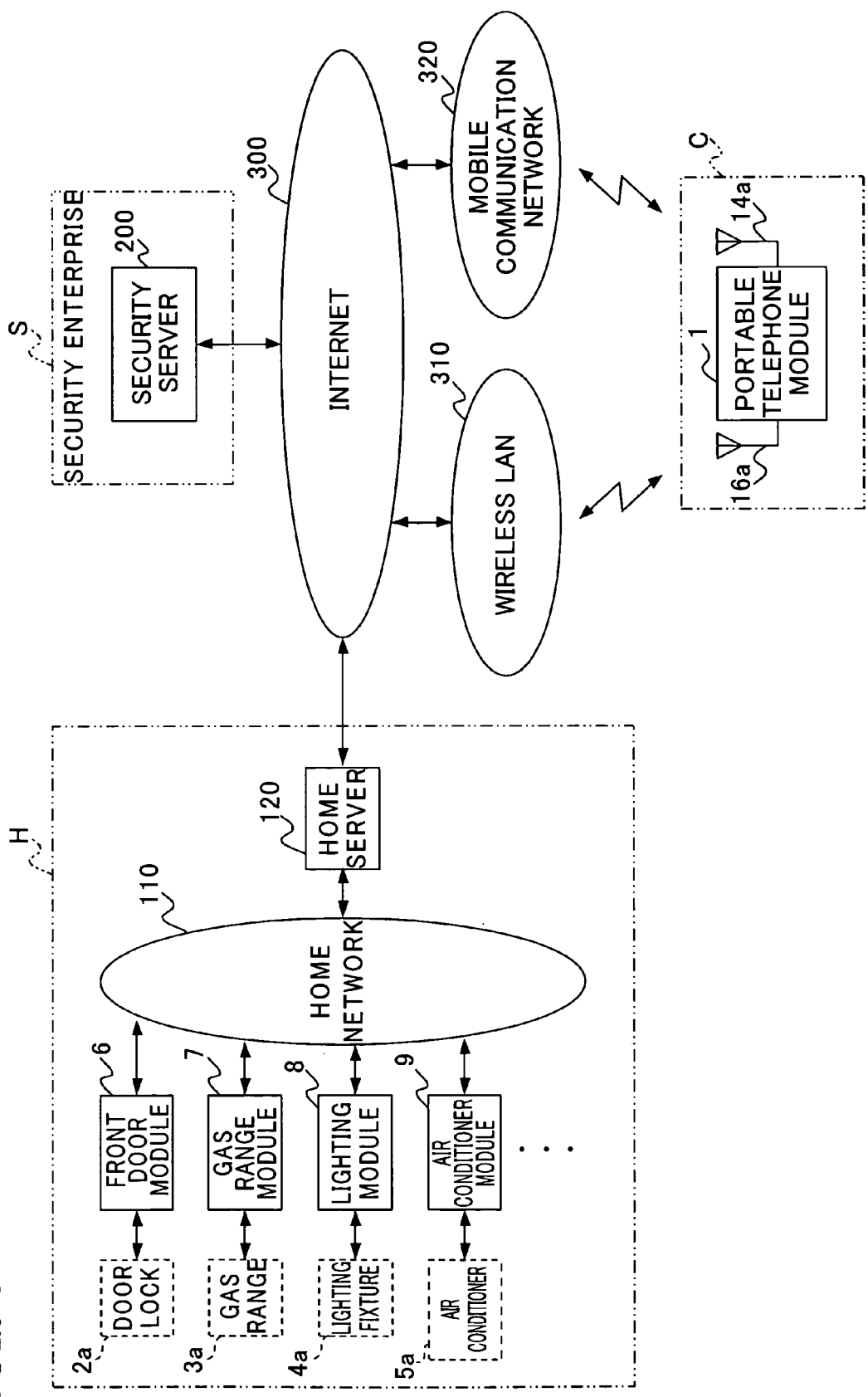
FIG. 7 is a block diagram showing the configuration of the home security system in a third aspect of the invention.

FIG. 7 is a block diagram showing the configuration of the home security system of the third aspect of the invention. Constituent components which are the same as in the home security system of the first aspect shown in FIG. 2 or that of the second aspect shown in FIG. 5 are assigned the same symbols, and detailed explanations are omitted.

The home security system of the third aspect has a portable telephone module 1, security server 200, home server 120, front door module 6, gas range module 7, lighting module 8, air conditioner module 9, and similar.

The home server 120 is installed in the house H, and similarly to the home server 100 in the second aspect shown in FIG. 5, has a processing device 101 and network IF device 103. The home server 120 is connected to the home network 110 through the network IF device 103, and is connected to the front door module 6, gas range module 7, lighting module 8, air conditioner module 9, and similar via the home network 110. On the other hand, the home server 120 has a network IF device for connection to the Internet 300, and by means of this network IF device is connected to the Internet 300.

However, in this aspect the home server 120 is configured so as to be accessed from the portable telephone module 1 via the security server 200 and Internet 300, and does not communicate directly by wireless signals with the portable telephone module 1. Hence the home server 120, unlike the home server 100, does not have an RF device 102 or antenna 102a.

The security server 200 is a server owned or operated by a security enterprise S which provides home security services, and is connected to the Internet 300.

The portable telephone module 1 can communicate with an access point (not shown) of a wireless LAN 310 via an RF device 16 (see FIG. 2 and FIG. 5) and antenna 16a. This access point is for example installed in an Internet café, and in future, in addition to Internet cafés, will also be installed at prescribed intervals in urban areas.

The wireless LAN 310 is connected to the Internet 300 via a gateway or similar (not shown). By this means, the portable telephone module 1 can communicate with the security server 200 via the wireless LAN 310 and the Internet 300, using the IP address of the security server 200.

On the other hand, the portable telephone module 1 can communicate with a base station (not shown) of the mobile communication network 320 via the mobile wireless communication device 14 (see FIG. 2 and FIG. 5) and antenna 14a. The mobile communication network 320 is connected to the Internet 300 via a gateway or similar (not shown). By this means, the portable telephone module 1 can communicate with the security server 200 via the mobile communication network 320 and the Internet 300, using the IP address (or telephone number) of the security server 200.

The security enterprise S allocates a subscriber identifier (subscriber ID) to a subscriber (resident of the house) who has subscribed to a home security service offered by the enterprise, and allocates a home server identifier (home server ID) to the home server of the subscriber house. The subscriber ID may be the same as the portable telephone ID in the first and second aspects, or may be different.

Upon subscription, the subscriber ID and home server ID are registered in a subscriber information table stored in internal memory (a hard disk or similar) of the security server 200.

FIG. 8 shows an example of a subscriber information table stored in the security server 200. The subscriber information table has subscriber IDs of subscribers to the home security service; home server IDs of home servers provided in the houses H of subscribers; home server IP addresses; subscriber names, addresses and phone numbers; a list of household equipment units provided in the house H; and other data fields. Upon subscription, these data fields are registered with the security server 200, and based on this data the security server 200 provides a home security service.

The subscriber ID and IP address of the security server 200 are stored in the memory of the processing device 11 of the portable telephone module 1 as well upon subscription. The home server ID is also stored in memory of the home server 120.

Figure 9:
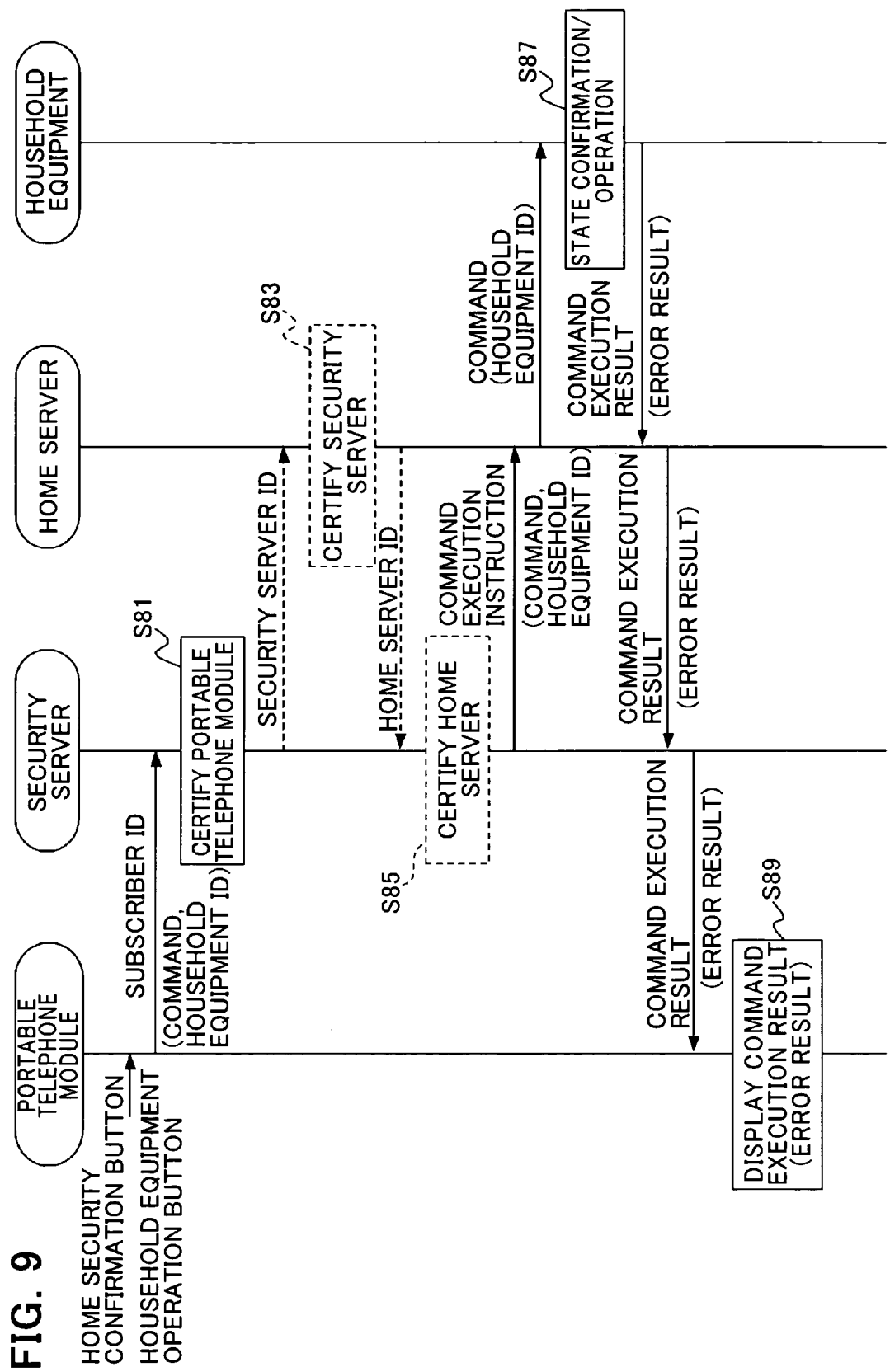
FIG. 9 is a sequence diagram showing the flow of processing of the home security system in the third aspect of the invention.

This configuration is explained below with respect to processing for state confirmation and operation of household equipment in the home security system of the third aspect. FIG. 9 is a sequence diagram showing the flow of processing of the home security system in the third aspect.

When the home security confirmation button or household equipment operation button is operated by the resident P, the processing device 11 of the portable telephone module 1 accesses the wireless LAN 310 through the RF device 16, or accesses the mobile communication network 320 through the mobile wireless communication device 14. Which access method is used can be selected by the resident P, or can be selected as appropriate to communication conditions of the processing device 11, based on the communication state (radio wave intensity and similar) at the time of access.

Next, the portable telephone module 1 transmits the subscriber ID and a command (and a household equipment unit ID) to the security server 200 over one among the wireless LAN 310 or mobile communication network 320 and the Internet 300 (S81).

The security server 200, upon receiving the subscriber ID from the portable telephone module 1, searches the subscriber information table (see FIG. 8), and judges whether the received subscriber ID is registered. If the received subscriber ID is registered in the subscriber information table, the security server 200 certifies the portable telephone module 1 (portable telephone C, resident P). If the received subscriber ID is not registered in the subscriber information table, certification is not performed, and so subsequent processing is not executed.

Next, the security server 200 transmits an instruction to execute a command (command execution instruction) and the command transmitted from the portable telephone module 1 to the home server 120 over the Internet, using the IP address of the home server 300 corresponding to the subscriber ID. Similarly to the first aspect, the household equipment unit ID may be transmitted together with the command in order to identify the household equipment unit module which is to execute the command.

Here, before the security server 200 transmits the command execution instruction to the home server 120, the security server 200 and home server 120 may certify each other, as indicated by the dashed-line arrows and blocks in FIG. 9.

Specifically, the security server 200 transmits the security server identifier (security server ID) to the home server 120 over the Internet 300. The security server ID is registered in the memory of the home server 120 at the time of service subscription; the home server 120 compares the security server ID registered in memory with the security server ID transmitted by the security server 200. If the comparison result indicates that the two security server IDs coincide, then the home server 120 certifies the security server 200 (S83).

After certification of the security server 200, the home server 120 transmits the home server ID to the security server 200 over the Internet 300. The security server 200 compares the home server ID transmitted by the home server 120 with the home server ID registered in the subscriber information table (see FIG. 8), and if the two home server IDs coincide, certifies the home server 120 (S85).

When the command execution instruction and command (and household equipment unit ID) are transmitted from the security server 200 to the home server 120, similarly to the above-described second aspect, the home server 120 transmits the command to the household equipment unit module which is to execute the command over the home network 110, and thereafter receives the command execution result from the household equipment unit module over the home network 110 (S87; see steps S63 to S67, S71, S73 in FIG. 6).

Next, the home server 120 returns the command execution result (or the error processing result (error message or similar)) received from the household equipment unit module to the security server 200 over the Internet 300. The security server 200 returns the returned command execution result (or error result) to the portable telephone module 1 over the Internet 300 and over the wireless LAN 310 or the mobile communication network 320. The portable telephone module 1 displays the returned command execution result on the LCD 13 (S89). By this means, the resident P can confirm the state of the household equipment, or can confirm the operation result.

Thus in this aspect, after the portable telephone module 1 is certified by the security server 200, the security server 200 accesses the home server 120 and performs state confirmation or operation of household equipment. Hence illicit access of the household equipment and home server 120 by a third party can be prevented. By adding the mutual certification of steps S83 and S85, security can be further enhanced, and illicit access by a third party to the home server 120 and household equipment within the house H can be prevented still more reliably.

The home server 120 may also return the command execution result (or error processing result) directly to the portable telephone module 1 over the Internet 300 and the wireless LAN 310 or mobile communication network 320, without passing through the security server 200.

Information (in particular subscriber IDs, security server IDs, home server IDs, and similar) passing through at least one among the wireless LAN 310, mobile communication network 320, and Internet 300 can be encrypted and transmitted. By this means, security can be further enhanced.

This aspect was also explained for the example of a portable telephone C, but the functions of the portable telephone module 1 can be realized in a wristwatch.

Fourth Aspect

In a fourth aspect of the invention, the wireless certification server (wireless certification device) 400 of a wireless certification authority W certifies the portable telephone module 1 (portable telephone C, resident P), and after having provided electronic certification data to the security server 200 of the home security enterprise S, state confirmation or operation of household equipment is performed.

Figure 10:
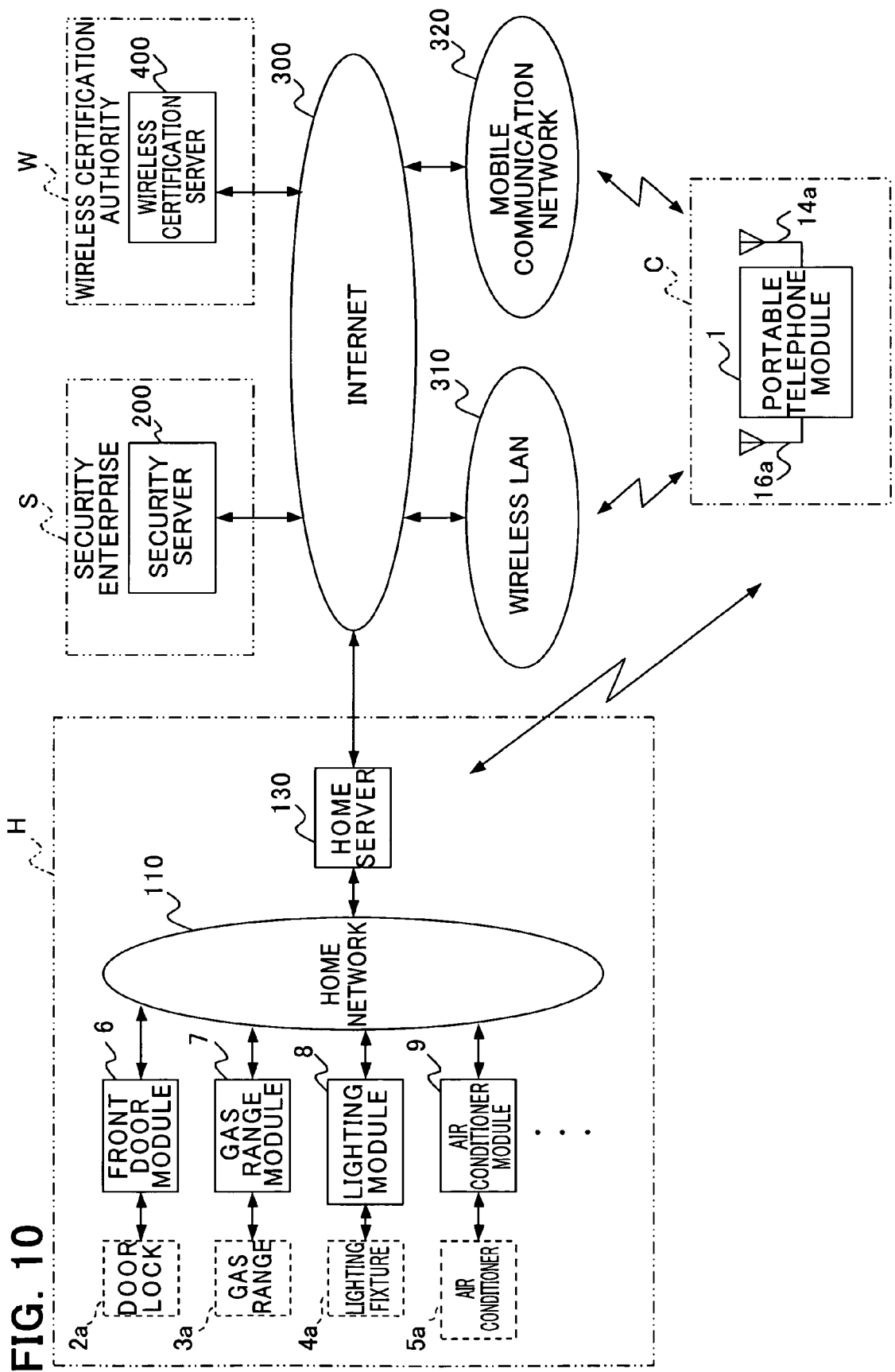
FIG. 10 is a block diagram showing the configuration of the home security system in a fourth aspect of the invention.

FIG. 10 is a block diagram showing the configuration of the home security system of the fourth aspect of the invention. Constituent components which are the same as in the home security systems of the second aspect shown in FIG. 5 or the third aspect shown in FIG. 7 are assigned the same symbols, and detailed explanations are omitted.

The home security system of this fourth aspect has a portable telephone module 1; security server 200; wireless certification server 400; home server 130; and front door module 6, gas range module 7, lighting module 8, air conditioner module 9, and similar.

The wireless certification server 400 is a server owned or operated by the wireless certification authority W, and holds an electronic certification information table in an internal storage device (hard disk or similar). FIG. 11 shows an example of a wireless electronic certification information table held by the wireless certification server 400. The wireless certification information table has fields for the identifiers (registrant IDs) of registrants (here, residents P) registered with the wireless certification authority W, and registrant names, addresses, telephone numbers, gender, age, and date of registration.

The registrant ID is an identifier issued by the wireless certification authority W to the resident P upon registration by the resident P, and is information used to uniquely identify the registrant. This registrant ID may be the same as the subscriber ID (see FIG. 8) in the subscriber information table held by the security server 200, or may be different. If different, a data field for the registrant ID is provided in the subscriber information table in order to associate subscriber IDs with registrant IDs.

This registrant ID is stored (registered) in the memory of the portable telephone module 1 possessed by the resident P when the resident P registers with the wireless certification authority W.

The wireless certification server 400 is connected to the Internet 300, and upon receiving an electronic certification issue request and registrant ID from the portable telephone module 1 over the Internet 300, issues the electronic certification data (that is, a certificate of existence certifying that the resident P actually exists) corresponding to the registrant ID, based on the electronic certification information table.

The home server 130 is installed in the house H, and is connected to both the home network 110 and to the Internet 300. The home server 130 has, in addition to the processing device 101, RF device 102, antenna 102a, and network IF device 103 (see FIG. 5) which are constituent components of the home server 100 in the second aspect, a network IF device for connection to the Internet 300.

Thus the home server 130 has an RF device 102 and antenna 102a, and so differs from the above-described third aspect in that the home server 130 communicates directly by wireless means with the portable telephone module 1 when the portable telephone module 1 exists within a short distance (several meters to several tens of meters).

Figure 12:
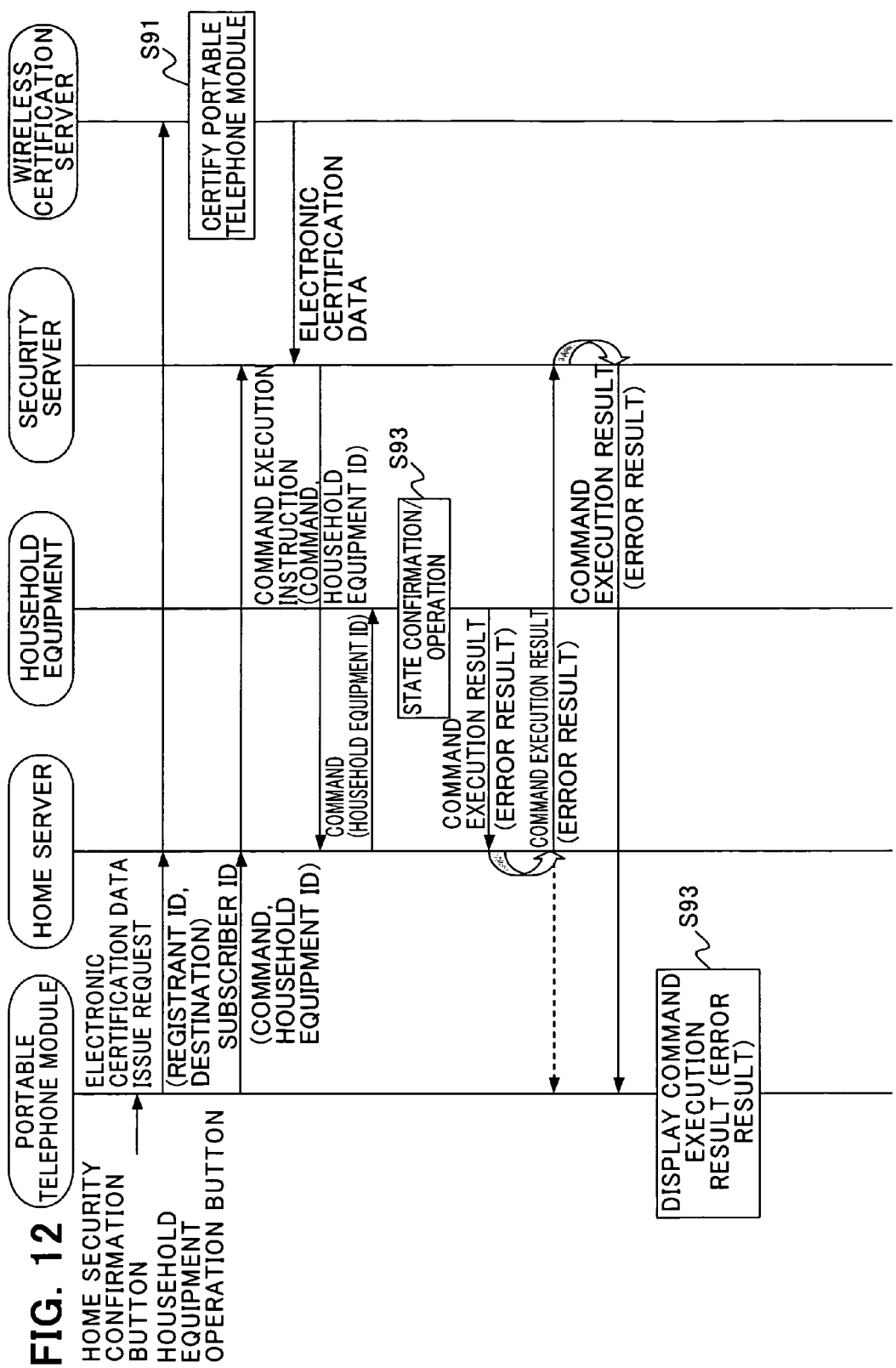

Processing to perform state confirmation and operation of household equipment in the home security system of the fourth aspect configured as described above is explained below. FIG. 12 is a sequence diagram showing the flow of processing of the home security system in the fourth aspect of the invention.

When the home security confirmation button or household equipment operation button is operated by the resident P, the portable telephone module 1 accesses the wireless certification server 400 and security server 200 by means of one of three routes (first through third routes).

The first route is a route by which the portable telephone module 1 accesses the wireless certification server 400 and security server 200 via the home server 130 and Internet 300. This first route is selected when the portable telephone module 1 is positioned a short distance (several meters to several tens of meters) from the home server 130, and the RF device 16 of the portable telephone 1 can communicate with the RF device 102 of the home server 130.

The second route is a route by which the portable telephone module 1 accesses the wireless certification server 400 and security server 200 via the wireless LAN 310 and the Internet 300. This second route is selected when the portable telephone module 1 is not within a short distance from the home server 130 and cannot communicate with the home server 130, but is positioned in a range such that the RF device 16 can communicate with an access point of the wireless LAN 310.

The third route is a route by which the portable telephone module 1 accesses the wireless certification server 400 and security server 200 via the portable telephone communication network 320 and the Internet 300. This third route is selected when the portable telephone module 1 is not within a short distance from the home server 130 and cannot communicate with the home server 130, but is positioned in a range such that communication with a base station of the portable telephone communication network 320 by means of the mobile wireless communication device 14 is possible.

When communication is possible via any of these first through third routes, the first route may be preferentially selected, or a route specified by the resident P may be selected. Or, a route with satisfactory communication conditions may be selected. Similar considerations apply when communication is possible via the first and second routes, or via the first and third routes. When communication is possible via the second and third routes, a route specified by the resident P, or a route with satisfactory communication conditions, can be selected.

The portable telephone module 1 accesses the wireless certification server 400 and transmits an electronic certification data issue request to the wireless certification server 400. This electronic certification data issue request contains a registrant ID stored (registered) in the portable telephone module 1 and a destination (here, the security server 200) for the electronic certification data. The destination may be represented by for example the IP address of the destination, or the IP address and name (for example, the name of security enterprise S) of the destination.

In addition, the portable telephone module 1 accesses the security server 200, and transmits a subscriber ID and command (and household equipment unit ID) to the security server 200.

The wireless certification server 400 searches the electronic certification information table (see FIG. 11), and checks whether a registrant exists with the same ID as the registrant ID contained in the electronic certification data issue request. If a registrant with the same ID exists in the electronic certification information table, the wireless certification server 400 certifies the portable telephone module 1 (portable telephone C, resident P) (S91), and issues electronic certification data corresponding to the registrant ID to the destination contained in the electronic certification data issue request (that is, to the security server 200). The issued electronic certification data contains the data fields of the electronic certification information table shown in FIG. 11 (registrant ID, name, address, telephone number, gender, age, and similar).

After the electronic certification data is issued, the wireless certification server 400 stores, in a storage device, a log indicating that there has been an electronic certification data issue request from the resident P and that electronic certification data was issued to the security server 200 in response to the request. By means of this log, the security enterprise S can demonstrate to resident P that state confirmation or operation of household equipment in the house H was not performed without permission, but was performed in response to a request from resident P.

When an ID coinciding with the registrant ID contained in the electronic certification data issue request does not exist in the electronic certification information table, the wireless certification server 400 does not issue electronic certification data. Hence the subsequent household equipment state confirmation or operation processing is not executed.

The security server 200, upon receiving the subscriber ID and command (and household equipment unit ID) from the portable telephone module 1, and upon receiving the electronic certification data from the wireless certification server 400, confirms that the subscriber ID corresponds to the registrant ID contained in the certification data, and then transmits the command execution instruction and command (and household equipment unit ID) to the home server 130.

If the security server 200 does not receive at least one among the subscriber ID from the portable telephone module 1 and the electronic certification data from the wireless certification server 400, it does not transmit the command execution instruction (and command) to the home server 130. As a result, state confirmation or operation of household equipment is not executed.

In this way, if the security server 200 receives only the subscriber ID, the command execution instruction is not provided to the home server 130; in addition to the subscriber ID, by having the wireless certification server 400 (wireless certification authority W) issue electronic certification data, the command execution instruction is provided to the home server 130. As a result security is enhanced, and a third party can be prevented from illicitly accessing household equipment in the house H and ascertaining the state of or operating the household equipment.

Thereafter, similarly to the third aspect, the command is executed by the relevant household equipment unit modules (S93), and the state or operation result (or error result) for the household equipment is returned to the home server 130.

As indicated by the solid lines in FIG. 12, the home server 130 returns the command execution result (or error result) to the security server 200, and the security server 200 returns the command execution result (or error processing result) to the portable telephone module 1. Or, as indicated by the broken lines in FIG. 12, the home server 130 may return the command execution result (or error processing result) to the portable telephone module 1 without passing through the security server 200, either directly by wireless means, or via the Internet 300 and wireless LAN 310, or via the Internet 300 and mobile communication network 320.

The command execution result (or error processing result) returned to the portable telephone module 1 is displayed on the LCD 13 (S93). By this means, the resident P can confirm the state of household equipment, or can confirm the operation result.

Similarly to the third aspect, before the security server 200 transmits the command execution instruction to the home server 130, the security server 200 and home server 130 may exchange their own IDs and perform mutual certification.

Moreover, information (in particular subscriber IDs, registrant Ids, security server IDs, home server IDs, and similar) passing through at least one among the wireless LAN 310, mobile communication network 320, and Internet 300 can be encrypted and transmitted. By this means, security can be further enhanced.

This aspect was also explained for the example of a portable telephone C, but the functions of the portable telephone module 1 can be realized in a wristwatch.

Other Aspects

In the fourth aspect, the security server 200 and wireless certification server 400 can be integrated as a single server. That is, the integrated server issues electronic certification data and records logs, as well as performing state confirmation and operation of household equipment.

In the second aspect, the home server 100 and one of the household equipment unit modules, such as for example the front door module 6, can be integrated. In this case, the front door module 6 becomes the master module, and the other household equipment unit modules become slave modules. Similar configurations can be adopted in the third and fourth aspects as well.

In the first through fourth aspects, by incorporating a use limitation device into the portable telephone C, and by incorporating into a wristwatch possessed by the resident P a transmission device which exchanges IDs with the use limitation device by means of wireless signals, if the transmission device (that is, resident P wearing the wristwatch) moves farther than a prescribed distance from portable telephone C (that is, the portable telephone module 1), the use limitation device can be made to render the portable telephone C unusable.

That is, the transmission device transmits its own ID (the transmission device ID) at prescribed time intervals by means of wireless signals. The use limitation device receives the transmission device ID, and compares the received transmission device ID with a transmission device ID stored in advance. If the two transmission device IDs coincide, the use limitation device transmits the portable telephone ID by means of wireless signals.

The transmission device, upon receiving the portable telephone ID, compares the received portable telephone ID with a portable telephone ID stored in advance. If the two portable telephone IDs coincide, the transmission device again repeats transmission of the transmission device ID at fixed time intervals.

If on the other hand the use limitation device (that is, the portable telephone module 1 and portable telephone C) move away from the transmission device incorporated into the wristwatch due to loss, misplacement or theft of the portable telephone C or similar, then the radio wave intensity of the transmission device ID signal received by the use limitation device becomes weak. When this radio wave intensity drops below a prescribed threshold, the use limitation device renders unusable the portable telephone C and portable telephone module 1. For example, power supplied from the power supply (battery) to the portable telephone C and portable telephone module 1 may be stopped, or the portable telephone C may otherwise be rendered inoperable.

When the intensity of radio waves received from the use limitation device falls below a prescribed threshold, the transmission device (wristwatch) causes a buzzer to sound, or otherwise notifies the resident P of the loss, misplacement, theft or similar of the portable telephone C. By this means, illicit use of the portable telephone C by a third party, and illicit access of household equipment, can be prevented, and security can be further enhanced.

INDUSTRIAL APPLICABILITY

This invention can be used in a home security system.

By means of this invention, the door locks, gas appliances, electrical appliances, and other household equipment provided in a house can be monitored remotely, the states thereof can be checked, and the states thereof can be changed.

Further, by means of this invention the illicit confirmation of states and operation of such household equipment by a third party can be effectively prevented.

The invention claimed is:

1. A home security system for performing state monitoring or operation of household equipment modules installed in a house, the home security system comprising:
   a portable device comprising:
      a first transmission portion to transmit M-series data using wireless signals in a predetermined interval to the household equipment modules;
      a first storage portion to store an identifier of the portable device and an identifier of a household equipment module;
      a first reception portion to receive household equipment identifiers responded to the M-series data respectively from the household equipment modules;
      a first comparison portion to compare the household equipment device identifier received by said first reception portion with the household equipment device identifier stored in the first storage portion; and
      a second transmission portion to transmit when the result of comparison by the first comparison portion indicates that one of the received household equipment device identifiers and the household equipment device identifier stored in the first storage portion coincide, the identifier of the portable device stored in said first storage portion and a command for the household equipment module of the received identifier by using wireless signals; and
   each of the household equipment modules installed in the house comprising:
      a second storage portion to store the household equipment device identifier and an identifier of the portable device;
      a second reception portion to receive and determine the M-series data transmitted M-series data has a relation with the household equipment device
      a third transmission portion to transmit the household equipment device identifier stored in said second storage portion, responsively to the received and determined M series data,
      a third reception portion to receive the portable device identifier and the command transmitted from the portable device,
      a second comparison portion to compare the portable device identifier received by the third reception portion with said portable device identifier stored in said second storage portion, and
      an execution portion which, when the result of comparison by said second comparison portion indicates that the two portable device identifiers coincide, executes the command received by said third reception portion.

2. The home security system according to claim 1, wherein
   said household equipment device further comprises a fourth transmission portion which transmits, by means of wireless signals, the result of execution of said command by said execution portion; and,
   said portable device further comprises a fourth reception portion which, after transmission of said command by said first transmission portion, receives said command execution result transmitted from said household equipment device by wireless signals, and a display portion which displays said command execution result received by said fourth reception portion.

3. A home security system for performing state monitoring or operation of household equipment installed in a house, to which household equipment devices are connected, the home security system comprising:
- a home server connected to the household equipment devices via a home network;
- a portable device comprising:
  - an input portion to input commands for monitoring or operation of the household equipment;
  - a first transmission portion to transmit M-series data using wireless signals in a predetermined interval to the household equipment;
  - a first storage portion to store an identifier of the portable device and an identifier of the home server;
  - a first reception portion to receive a home server identifier responded to the M-series data from the home server by wireless signals;
  - a first comparison portion to compare the home server identifier received by the first reception portion and the home server identifier stored in said first storage portion; and,
  - a second transmission portion which, when the result of comparison by the first comparison portion indicates that the two identifiers coincide, transmits the portable device identifier stored in the first storage portion and a command input by the input portion, using wireless signals;
- the home server comprising:
  - a second storage portion to store the home server identifier and the portable device identifier;
  - a third transmission portion to transmit the home server identifier stored in the second storage portion, using wireless signals;
  - a second reception portion to receive the portable device identifier and the command transmitted by said second transmission portion;
  - a second comparison portion, which compares the portable device identifier received by the second reception portion and the portable device identifier stored in said second storage portion; and,
  - a fourth transmission portion, which, when the result of comparison by said second comparison portion indicates that the two identifiers coincide, transmits the command received by the second reception portion to the household equipment device via the home network; and wherein said
- the household equipment device comprising:
  - a third reception portion to receive the command transmitted by the fourth third transmission portion; and,
  - an execution portion to execute the command received by the third reception portion.

4. The home security system according to claim 3, wherein said household equipment device further comprises a fifth transmission portion, which transmits the result of execution of said command by said execution portion via said home network;
said home server comprises a fifth reception portion which receives said command execution result transmitted by said fifth transmission portion, and a sixth transmission portion which transmits using wireless signals said command execution result received by said fifth reception portion; and,
said portable device further comprises a sixth reception portion which receives said command execution result transmitted using wireless signals from said sixth transmission portion, and a display portion which displays said command execution result received by said sixth reception portion.

5. The home security system according to claim 3, wherein said home server is configured integrally with said household equipment device.

6. A home security system for performing state monitoring or operation of household equipment modules installed in a house, the home security system comprising:
- a portable device comprising:
  - a first transmission portion to transmit M-series data using wireless signals in a predetermined interval to the household equipment modules;
  - a first storage portion to store an identifier of the portable device and an identifier of a household equipment module;
  - a first reception portion to receive household equipment identifiers responded to the M-series data respectively from the household equipment modules;
  - a first comparison portion to compare the household equipment identifiers received by said first reception portion with the household equipment device identifier stored in the first storage portion; and
  - a second transmission portion to transmit, when the result of comparison by the first comparison portion indicates that one of the received household equipment device identifiers and the household equipment device identifier stored in the first storage portion coincide, the identifier of the portable device stored in said first storage portion and a command for the household equipment module of the received identifier by using wireless signals.

7. A home security system for performing state monitoring or operation of household equipment installed in a house, to which household equipment devices are connected, the home security system comprising:
- a home server connected to the household equipment devices via a home network; the home server comprising:
  - a first storage portion to store a home server identifier and a portable device identifier;
  - a first transmission portion to transmit the home server identifier stored in the first storage portion, using wireless signals;
  - a first reception portion to receive the portable device identifier and a command transmitted by a second transmission portion of the portable device;
  - a first comparison portion, which compares the portable device identifier received by the first reception portion and the portable device identifier stored in said first storage portion; and,
  - a second transmission portion, which, when a result of comparison by said first comparison portion indicates that the two identifiers coincide, transmits the command received by the first reception portion to the household equipment device via the home network; and
- the household equipment device comprising:
  - a second reception portion to receive the command transmitted by the first transmission portion; and,
  - an execution portion to execute the command received by the second reception portion.

* * * * *